(12) United States Patent
Minamisawa et al.

(10) Patent No.: US 10,948,736 B2
(45) Date of Patent: Mar. 16, 2021

(54) OPTICAL UNIT WITH SHAKE CORRECTION FUNCTION HAVING MAGNETIC DRIVING MECHANISM AND FLEXIBLE PRINTED CIRCUIT BOARD

(71) Applicant: NIDEC SANKYO CORPORATION, Nagano (JP)

(72) Inventors: Shinji Minamisawa, Nagano (JP); Masato Gomyo, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 287 days.

(21) Appl. No.: 16/029,668

(22) Filed: Jul. 9, 2018

(65) Prior Publication Data
US 2019/0018258 A1     Jan. 17, 2019

(30) Foreign Application Priority Data
Jul. 12, 2017   (JP) .............................. JP2017-136037

(51) Int. Cl.
*G02B 27/64*     (2006.01)
*G03B 5/06*      (2006.01)
(Continued)

(52) U.S. Cl.
CPC ............. *G02B 27/646* (2013.01); *G03B 5/06* (2013.01); *H04N 5/2253* (2013.01);
(Continued)

(58) Field of Classification Search
CPC ................... G02B 27/646; G03B 3/10; G03B 2205/0015; G03B 2205/0023;
(Continued)

(56) References Cited

U.S. PATENT DOCUMENTS

2007/0127904 A1   6/2007   Iwasaki et al.
2007/0183764 A1   8/2007   Imura et al.
(Continued)

FOREIGN PATENT DOCUMENTS

CN   85101413   1/1987
CN   1584726    2/2005
(Continued)

OTHER PUBLICATIONS

"Office Action of China Counterpart Application", dated Jul. 3, 2020, with English translation thereof, pp. 1-28.

*Primary Examiner* — Ryan S Dunning
(74) *Attorney, Agent, or Firm* — JCIPRNET

(57) ABSTRACT

To draw a flexible printed circuit board in a small space with high flexibility in an optical unit with shake correction function. In an optical unit with rolling correction function, a first flexible printed circuit board for an imaging element is drawn around an optical axis of the optical unit with rolling correction function such that the first flexible printed circuit board is wound by substantially a turn in a circumferential direction at an identical height in an optical axis direction. Furthermore, in a portion wound in the circumferential direction (i.e., a connection part), one end and the other end in the circumferential direction are at an identical height in the optical axis direction. Furthermore, a second flexible printed circuit board for a rolling magnetic driving mechanism and a third flexible printed circuit board for a swing magnetic driving mechanism are also drawn in a similar manner.

19 Claims, 14 Drawing Sheets

(51) Int. Cl.
  *H04N 5/225* (2006.01)
  *H04N 5/232* (2006.01)
  *G03B 3/10* (2021.01)

(52) U.S. Cl.
  CPC ....... *H04N 5/2257* (2013.01); *H04N 5/22521* (2018.08); *H04N 5/23287* (2013.01); *G03B 3/10* (2013.01); *G03B 2205/0023* (2013.01); *G03B 2205/0069* (2013.01)

(58) Field of Classification Search
  CPC .... G03B 2205/0038; G03B 2205/0069; G03B 5/06; H04N 5/22521; H04N 5/2253; H04N 5/2254; H04N 5/2257; H04N 5/23287
  USPC ........................................................ 359/557
  See application file for complete search history.

(56) References Cited

U.S. PATENT DOCUMENTS

2011/0103782 A1  5/2011  Tsuruta et al.
2013/0121672 A1*  5/2013  Shikama .................. G03B 5/02
                                                              396/55
2015/0162813 A1  6/2015  Park
2015/0362695 A1*  12/2015  Shihoh ................. H04N 5/2254
                                                             250/208.1

FOREIGN PATENT DOCUMENTS

| | | |
|---|---|---|
| CN | 102736358 | 10/2012 |
| CN | 103226231 | 7/2013 |
| CN | 104871083 | 8/2015 |
| JP | H0961728 | 3/1997 |
| JP | H0961880 | 3/1997 |
| JP | H10186436 | 7/1998 |
| JP | 2000187260 | 7/2000 |
| JP | 2002196382 | 7/2002 |
| JP | 2006058761 | 3/2006 |
| JP | 2008-131251 | 6/2008 |
| JP | 2011066580 | 3/2011 |
| JP | 2015082072 | 4/2015 |
| JP | 2016061985 | 4/2016 |
| WO | 2011142153 | 11/2011 |

* cited by examiner

OPTICAL UNIT WITH SHAKE CORRECTION FUNCTION HAVING MAGNETIC DRIVING MECHANISM AND FLEXIBLE PRINTED CIRCUIT BOARD

CROSS REFERENCE TO RELATED APPLICATION

The present application claims priority under 35 U.S.C. § 119 to Japanese Application No. 2017-136037 filed Jul. 12, 2017, the entire content of which is incorporated herein by reference.

TECHNICAL FIELD

The present disclosure relates to an optical unit with shake correction function that corrects shake on an optical axis or shake on an axis orthogonal to the optical axis.

DESCRIPTION OF THE RELATED DOCUMENTS

Some optical units that are mounted on a cellular phone or a mobile object include a mechanism, which causes an optical module to swing or rotate in order to correct shake, so as to reduce jitter in a captured image, which is caused upon movement of the cellular phone or the mobile object. An optical unit of this type includes a swing mechanism which causes a movable member including an optical module to swing in a pitching (i.e., vertical swing/tilting) direction and in a yawing (i.e., transverse swing/panning) direction in accordance with tilt in the pitching direction and tilt in the yawing direction. Some optical units of this type include, in addition to such a swing mechanism, a rolling correction mechanism which causes a movable member including an optical module to rotate on an optical axis in accordance with shake on the optical axis.

In an optical unit of this type, a flexible printed circuit board is connected to a circuit board on which an imaging element is mounted. Therefore, the flexible printed circuit board is connected to a movable member. Furthermore, in a case of using, as a swing mechanism and a rolling correction mechanism, a magnetic driving mechanism in which a coil is opposed to a magnet, a coil is sometimes mounted on a movable member. In this case, a flexible printed circuit board for supplying power to the coil is connected to the movable member. The flexible printed circuit board is drawn between the movable member and a fixation member while being warped and is drawn out of the optical unit so as to allow the movable member to swing and rotate. Patent Literature 1 discloses an optical unit of this type.

[Patent Literature 1] Japanese Unexamined Patent Application Publication No. 2008-131251

In an optical unit that performs shake correction, a load for deforming a flexible printed circuit board sometimes increases depending on a direction in which a movable member moves and a warped shape of the flexible printed circuit board. Such a case involves a necessity to enhance driving force of a magnetic driving mechanism, which may result in upsizing of the magnetic driving mechanism and increase of power consumption. Furthermore, when the flexible printed circuit board is warped largely such that the flexible printed circuit board becomes deformed with ease, a wide space is required for drawing the flexible printed circuit board, which is disadvantageous in terms of downsizing of the optical unit.

In view of the above problem, at least an embodiment of the present disclosure provides an optical unit with shake correction function that enables swing or rotation of a movable member to which a flexible printed circuit board is connected, the flexible printed circuit board being drawn in a small space with high flexibility.

SUMMARY

To solve the above problem, an optical unit with shake correction function according to at least an embodiment of the present disclosure includes: an optical element; a rotation member that includes a circuit board on which an imaging element arranged on a counter object side of the optical element is mounted, and a rotational member to which the circuit board is fixed; a fixation member that is arranged on the counter object side of the rotational member; a rotation supporting mechanism that supports the rotational member such that the rotational member is able to rotate relative to the fixation member; a rolling magnetic driving mechanism that causes the rotational member to rotate on an optical axis of the optical element; a supporting member that is arranged on the counter object side of the fixation member; and a first flexible printed circuit board that is connected to the circuit board. The first flexible printed circuit board includes: a first circuit board portion that extends from the circuit board toward the counter object side; a second circuit board portion that is fixed to the supporting member; and a connection part that connects the first circuit board portion to the second circuit board portion. The connection part is wound more than a half turn in a circumferential direction with respect to the optical axis of the optical element. The connection part has one end and the other end in the circumferential direction that are at an identical position with regard to a height in an optical axis direction.

According to at least an embodiment of the present disclosure, the first flexible printed circuit board connected to the circuit board includes the connection part wound more than a half turn in the circumferential direction with respect to the optical axis at the identical height in the optical axis direction, and the connection part connects the first circuit board portion extending from the circuit board toward the counter object side, to the second circuit board portion fixed to the supporting member. It is thus possible to make the connection part flexible by winding the flexible circuit board more than a half turn in the circumferential direction at the identical height in the optical axis direction. Therefore, since the connection part becomes deformed with ease in rotating the rotation member on the optical axis, the first flexible printed circuit board is less likely to hinder the operation of the rotation member. It is accordingly possible to perform highly accurate shake correction without enhancing driving force of the rolling magnetic driving mechanism.

In at least an embodiment of the present disclosure, the following configuration may be employed. That is, the optical unit with shake correction function further includes: a swing supporting mechanism that supports a movable member including the optical element and the fixation member such that the movable member is able to swing relative to the supporting member on an axis orthogonal to the optical axis of the optical element; and a swing magnetic driving mechanism that corrects shake on the axis orthogonal to the optical axis of the movable member. In this case, since the first flexible printed circuit board is also flexible with respect to shake correction on an axis orthogonal to the optical axis, the first flexible printed circuit board is less likely to hinder the shake correction. It is accordingly possible to perform highly accurate shake correction without enhancing driving force of the swing magnetic driving mechanism.

To solve the above problem, furthermore, an optical unit with shake correction function according to at least an embodiment of the present disclosure includes: a movable member that includes an optical element, and a circuit board on which an imaging element arranged on a counter object side of the optical element is mounted; a supporting member that is arranged on the counter object side of the movable member; a swing supporting mechanism that supports the movable member such that the movable member is able to swing relative to the supporting member on an axis orthogonal to the optical axis of the optical element; a swing magnetic driving mechanism that causes the movable member to swing relative to the supporting member on the axis orthogonal to the optical axis; and a first flexible printed circuit board that is connected to the circuit board. The first flexible printed circuit board includes: a first circuit board portion that extends from the circuit board toward the counter object side; a second circuit board portion that is fixed to the supporting member; and a connection part that connects the first circuit board portion to the second circuit board portion. The connection part is wound more than a half turn in a circumferential direction with respect to the optical axis of the optical element. The connection part has one end and the other end in the circumferential direction that are at an identical position with regard to a height in an optical axis direction.

According to at least an embodiment of the present disclosure, the first flexible printed circuit board connected to the circuit board includes the connection part wound more than a half turn in the circumferential direction with respect to the optical axis, and the connection part connects the first circuit board portion extending from the circuit board toward the counter object side, to the second circuit board portion fixed to the supporting member. It is thus possible to make the connection part flexible by winding the flexible circuit board more than a half turn in the circumferential direction at the identical height in the optical axis direction. Therefore, since the connection part becomes deformed with ease in swinging the movable member on an axis orthogonal to the optical axis, the first flexible printed circuit board is less likely to hinder the operation of the movable member. It is accordingly possible to perform highly accurate shake connection without enhancing driving force of the swing magnetic driving mechanism.

In at least an embodiment of the present disclosure, it is preferable that at least a part of the first circuit board portion and at least a part of the second circuit board portion are provided at an identical angular position. In the above way, it is possible to wind the connection part a turn, and it is therefore possible to make the connection part evenly flexible over the overall circumference of the connection part.

In at least an embodiment of the present disclosure, it is preferable that the connection part has a circuit board surface that is perpendicular to a radial direction with respect to the optical axis. In the above way, it is possible to make the connection part flexible with respect to each of shake in a direction tilting to the optical axis and shake in a direction rotating on the optical axis.

In at least an embodiment of the present disclosure, it is preferable that the supporting member has a supporting member-side fixation surface that is perpendicular to the optical axis, the second circuit board portion includes: a fixation portion that is fixed to the supporting member-side fixation surface; and a rising part that rises from the fixation portion toward an object side, and the rising part is connected to the connection part. In the above way, it is possible to reduce a height, in the optical direction, of a fixation position where the supporting member is fixed, and it is therefore possible to reduce a height, in the optical axis direction, of a space for drawing the first flexible printed circuit board. It is accordingly possible to downsize the optical unit in the optical axis direction.

In at least an embodiment of the present disclosure, it is preferable that the supporting member-side fixation surface is formed with a projection part, and the second circuit board portion is formed with an engagement part to which the projection part is fitted. In the above way, it is possible to easily determine the position of the first flexible printed circuit board and fix the first flexible printed circuit board by means of the projection part and the engagement part.

In at least an embodiment of the present disclosure, it is preferable that the rotation member includes a rotation member-side fixation part that protrudes toward the counter object side, the first circuit board portion includes a first reinforcing part including a flexible circuit board and a reinforcing plate fixed to the flexible circuit board, and the first reinforcing part is fixed with a double-faced tape to the rotation member-side fixation part. In the above way, the double-faced tape used for fixing the portion where the reinforcing plate is fixed facilitates the handling of the fixed portion. It is accordingly possible to easily and accurately fix the reinforcing plate.

In this case, it is preferable that the rotation member-side fixation part includes: an outside fixation surface that is directed radially outward; and a pressing part that presses the first reinforcing part fixed to the outside fixation surface, from an outside of the first reinforcing part in a radial direction. In fixing the circuit board that is warped in a curved shape toward a surface directed radially outward, since the circuit board expands radially outward so as to become deformed in a direction to resolve the warpage, the circuit board is prone to be removed from the outside fixation surface. It is accordingly possible to prevent the first reinforcing part from being removed from the outside fixation surface, by providing the pressing part.

Also in this case, it is preferable that the rotation member-side fixation part includes an abutment part against which a counter object-side end edge of the first reinforcing part is abutted, and the pressing part is bent to extend from the abutment part. In the above way, it is possible to determine the position of the first reinforcing part in the optical axis direction. It is accordingly possible to define a height, in the optical axis direction, of a connection part winding start position, by means of the first reinforcing part.

In at least an embodiment of the present disclosure, the following configuration may be employed. That is, the rotation member-side fixation part includes an inside fixation surface that is directed radially inward, and a second flexible printed circuit board is fixed to the inside fixation surface. The following configuration may also be employed. That is, a third flexible printed circuit board is fixed to the outside fixation surface with the first flexible printed circuit board superimposed thereon. In the above way, it is possible to fix a plurality of flexible printed circuit boards in accordance with the orientations of the flexible printed circuit boards.

In at least an embodiment of the present disclosure, it is preferable that the first reinforcing part is larger in a width in a direction orthogonal to a direction from the circuit board to the first reinforcing part, than a portion of the flexible circuit board connecting the circuit board to the first reinforcing part. In the above way, it is possible to enlarge an area of the first reinforcing part and to enlarge a fixation area. It is accordingly possible to enhance the fixation strength of the first flexible printed circuit board.

In at least an embodiment of the present disclosure, the rotation member includes a heat dissipating member to which heat from the circuit board is transmitted, and the rotation member-side fixation part is a part of the heat dissipating member. In the above way, it is possible to dissipate heat that is generated from the imaging element, via the circuit board and the heat dissipating member. It is also possible to simplify the structure since a part of the heat dissipating member is used as a fixation part.

In at least an embodiment of the present disclosure, the rotation supporting mechanism includes a rotation shaft that is fixed to the rotational member via the heat dissipating member, and a bearing part that is disposed on the fixation member, and the connection part is arranged on an outer circumferential side of the rotation shaft exposed from the bearing part toward the counter object side of the fixation member. In the above way, it is possible to dissipate heat from the rotation shaft. Furthermore, it is possible to wind the connection part in the space on the outer circumferential side of the rotation supporting mechanism, and it is therefore possible to reduce the height of the optical unit in the optical axis direction.

Next, an optical unit with triaxial shake correction function according to at least an embodiment of the present disclosure includes: the above-described optical unit; and a shake correction mechanism that corrects shake on an axis orthogonal to the optical axis of the optical unit. In this case, since the first flexible printed circuit board is also flexible with respect to shake correction on an axis orthogonal to the optical axis, the first flexible printed circuit board is less likely to hinder the shake correction. It is accordingly possible to perform highly accurate shake correction without enhancing driving force of the shake correction mechanism.

According to at least an embodiment of the present disclosure, the first flexible printed circuit board connected to the circuit board includes the connection part wound more than a half turn in the circumferential direction with respect to the optical axis at the identical height in the optical axis direction, and the connection part connects the first circuit board portion extending from the circuit board toward the counter object side, to the second circuit board portion fixed to the supporting member. It is thus possible to make the connection part flexible by winding the flexible circuit board more than a half turn in the circumferential direction at the identical height in the optical axis direction. Therefore, since the connection part becomes deformed with ease in both the case of rotating the rotation member on the optical axis and the case of swinging the movable member on an axis orthogonal to the optical axis, the first flexible printed circuit board is less likely to hinder the operation of the rotation member or the operation of the movable member. It is accordingly possible to perform highly accurate shake correction without enhancing driving force of the rolling magnetic driving mechanism and driving force of the swing magnetic driving mechanism.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

The following description explains embodiments of an optical unit 1 with rolling correction function and an optical unit 100 with triaxial shake correction function including the optical unit 1 with rolling correction function, to which at least an embodiment of the present disclosure is applied, with reference to the drawings. In the present specification, with respect to an optical axis L of the optical unit 1 with rolling correction function, an L1 direction is defined as an object side in the optical axis L direction, and an L2 direction is defined as a counter object side in the optical axis L direction. The optical unit 1 with rolling correction function is an optical unit with shake correction function that corrects shake on the optical axis L. Furthermore, the optical unit 100 with triaxial shake correction function is an optical unit with shake correction function that corrects shake on the optical axis L and also corrects shake on an axis orthogonal to the optical axis L. Note that at least an embodiment of the present disclosure is applicable to an optical unit with shake correction function that corrects shake on an axis orthogonal to the optical axis L without having a rolling correction function.

(Optical Unit with Triaxial Shake Correction Function)

Figure 1:
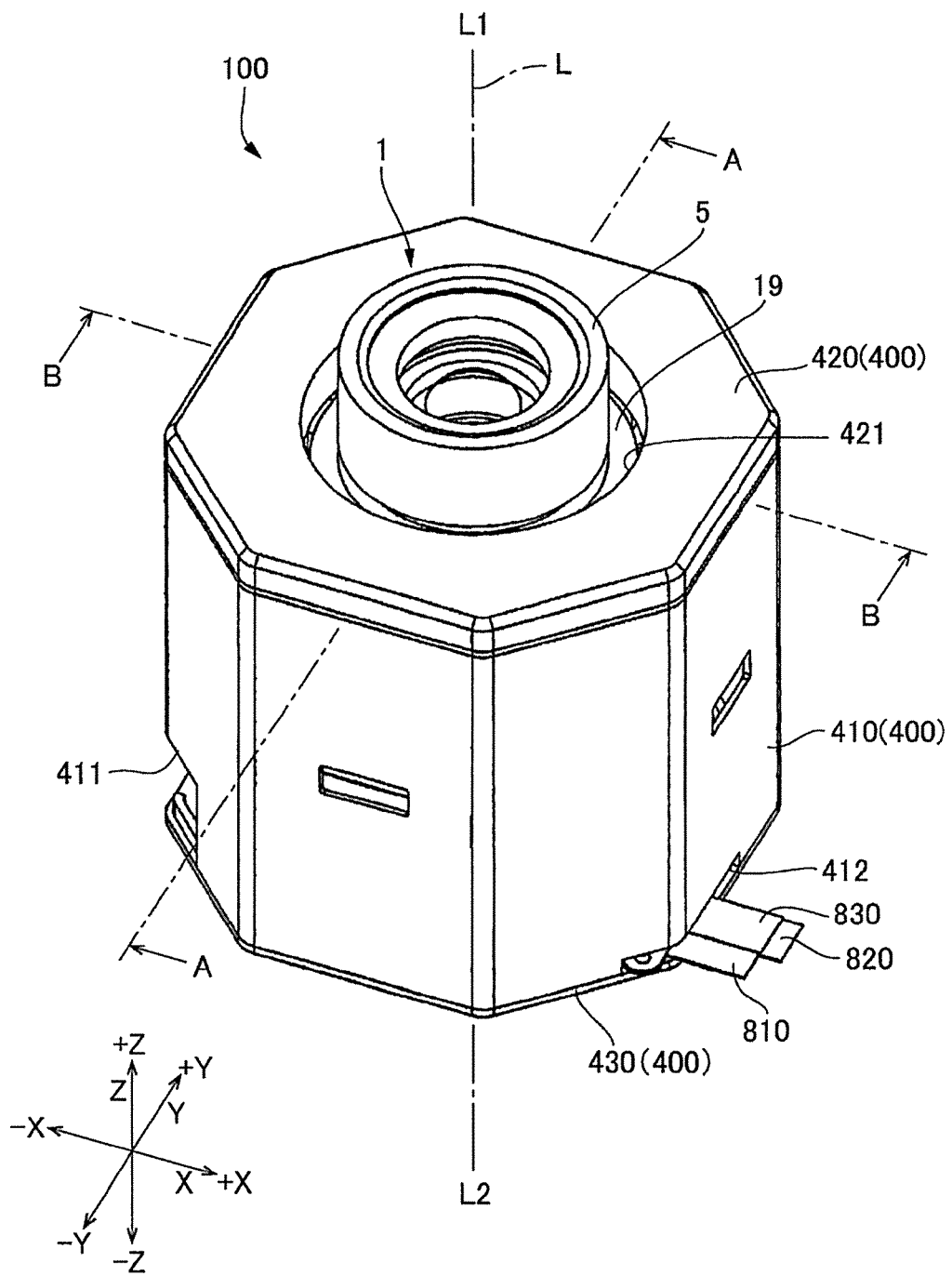
FIG. 1 is an external perspective view of an optical unit with triaxial shake correction function to which at least an embodiment of the present disclosure is applied.
Figure 2:
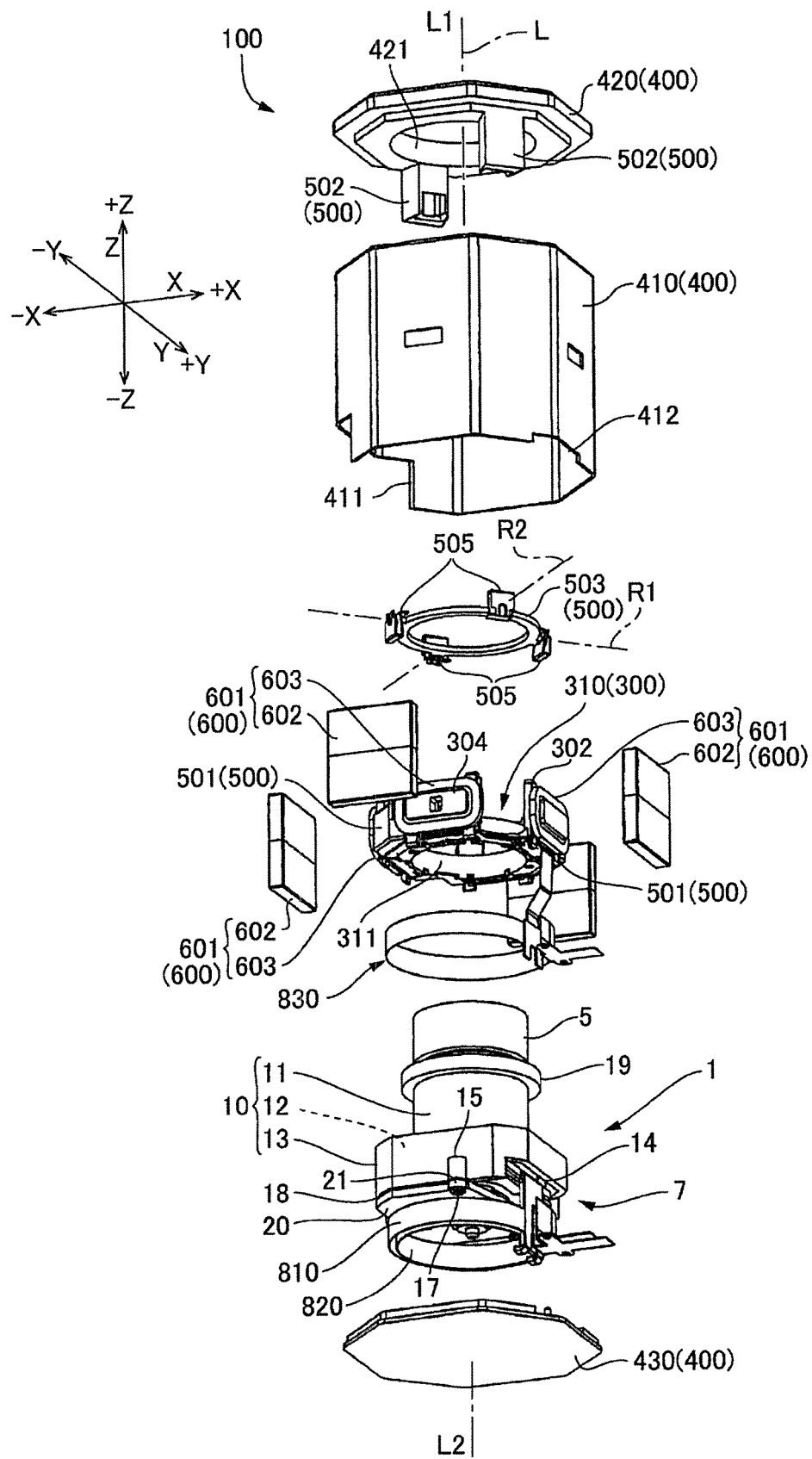
FIG. 2 is an exploded perspective view of the optical unit with triaxial shake correction function of FIG. 1.
Figure 3:
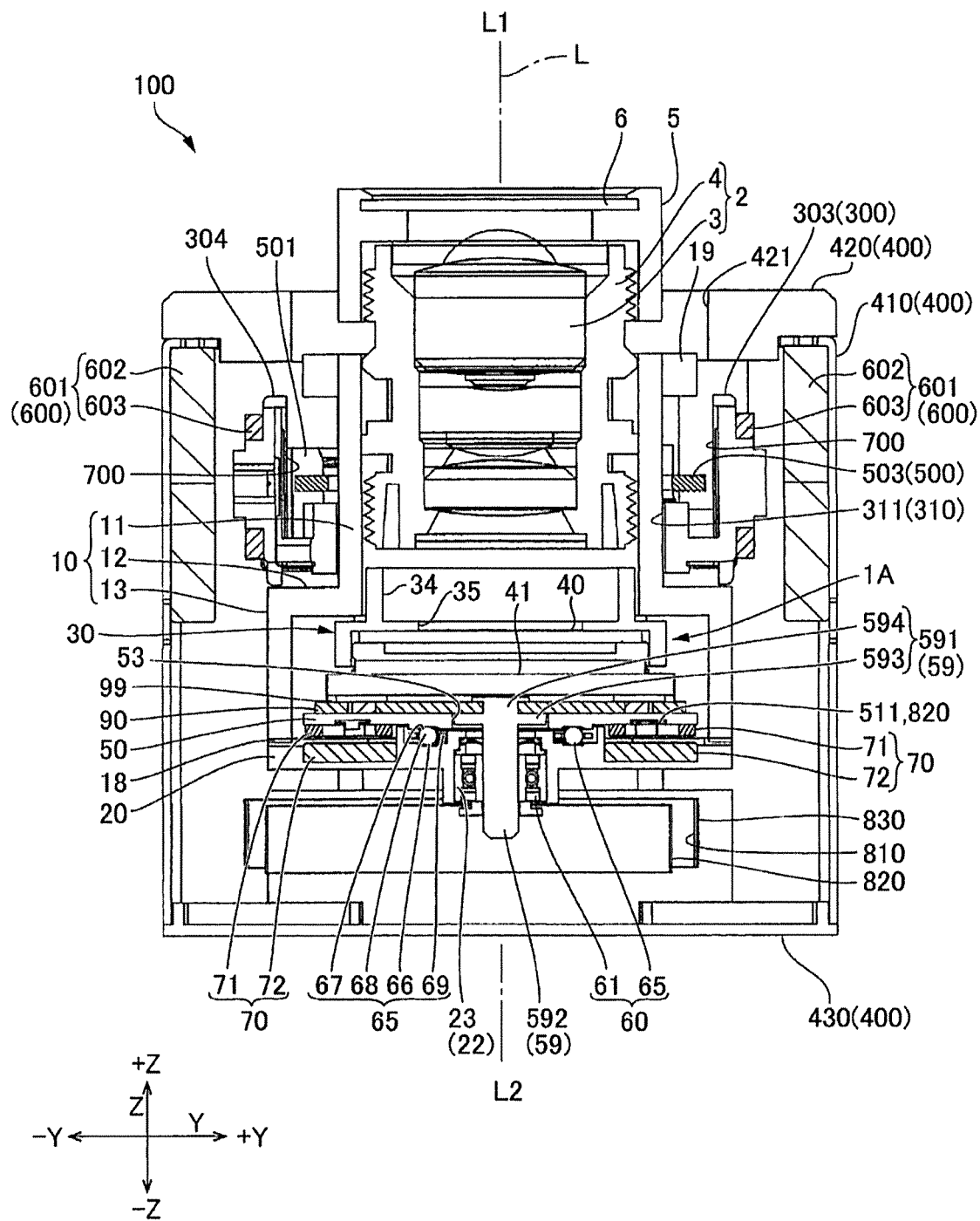
FIG. 3 is a cross-sectional view (i.e., a cross-sectional view taken along a line A-A) of the optical unit with triaxial shake correction function of FIG. 1.
Figure 4:
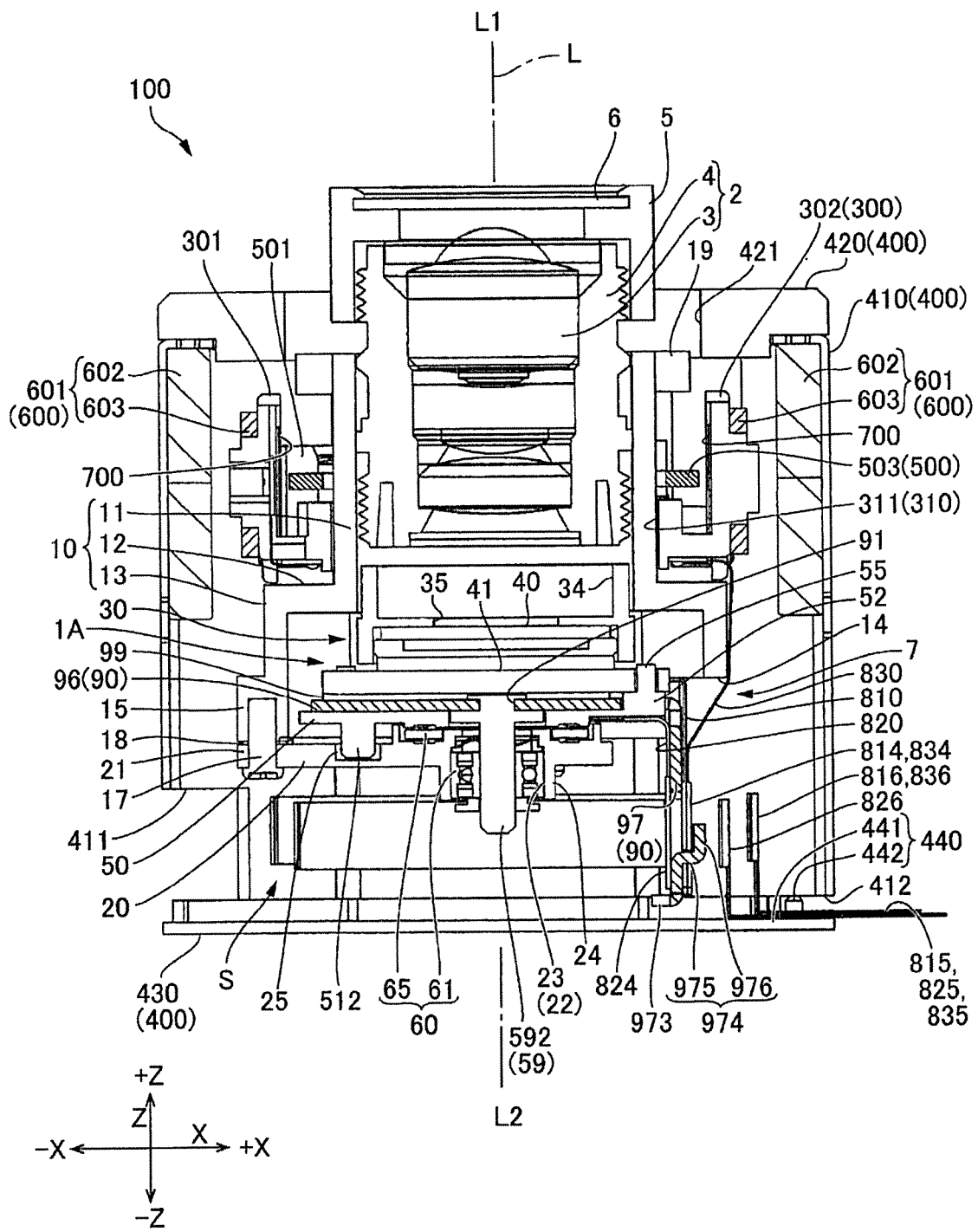
FIG. 4 is a cross-sectional view (i.e., a cross-sectional view taken along a line B-B) of the optical unit with triaxial shake correction function of FIG. 1.

FIG. 1 is an external perspective view of the optical unit 100 with triaxial shake correction function to which at least an embodiment of the present disclosure is applied. FIG. 2 is an exploded perspective view of the optical unit 100 with triaxial shake correction function of FIG. 1. FIGS. 3 and 4 are cross-sectional views of the optical unit 100 with triaxial shake correction function of FIG. 1. Specifically, the cross-sectional view of FIG. 3 is taken along a line A-A of FIG. 1, and the cross-sectional view of FIG. 4 is taken along a line B-B of FIG. 1. In FIGS. 1 and 2, directions of three axes X, Y and Z are orthogonal to each other. Further, one side of the X direction is indicated by +X and the other side is indicated by −X. Further, one side of the Y direction is indicated by +Y and the other side is indicated by −Y. Further, one side of the Z direction is indicated by +Z and the other side is indicated by −Z. The Z direction corresponds to the optical axis L direction of the optical unit 1 with rolling correction function when the optical unit 1 with rolling correction function is in a reference posture. Furthermore, the object side L1 corresponds to the +Z direction, and the counter object side L2 corresponds to the −Z direction.

The optical unit 100 with triaxial shake correction function is configured as follows. The optical unit 1 with rolling correction function that corrects shake on the optical axis L is incorporated in a unit including a shake correction mechanism that corrects shake on an axis orthogonal to the optical axis L. The optical unit 100 with triaxial shake correction function thus performs shake correction in a pitching (i.e., vertical swing) direction and a yawing (i.e., transverse swing) direction. The following description explains a swing supporting mechanism that supports the entire optical unit 1 with rolling correction function such that the optical unit 1 with rolling correction function is able to swing on an axis orthogonal to the optical axis L, and a swing driving mechanism that performs shake correction in the pitching (i.e., vertical swing) direction and the yawing (i.e., transverse swing) direction.

The optical unit 100 with triaxial shake correction function includes: the optical unit 1 with rolling correction function; a holder 300 that holds the optical unit 1 with rolling correction function; a supporting member 400 that is fixed to a main body of an optical device on which the optical unit 100 with triaxial shake correction function is mounted; a gimbal mechanism 500 that supports the optical unit 1 with rolling correction function and the holder 300 such that the optical unit 1 with rolling correction function and the holder 300 are able to swing relative to the supporting member 400; a swing magnetic driving mechanism 600 that causes the optical unit 1 with rolling correction function to swing relative to the supporting member 400; and magnetic members 700 that configure magnetic springs for recovering the optical unit 1 with rolling correction function to the reference posture.

As illustrated in FIG. 2, the optical unit 1 with rolling correction function includes: a lens holder 10 that includes a holder cylinder part 11 in a cylindrical shape; a fixation member 20 that is fixed to a counter object side L2 (−Z direction)-end portion of the lens holder 10; and a lens unit 2 (see FIGS. 3 and 4) that is held on an inner circumferential side of the holder cylinder part 11. A cap 5 provided with a cover glass 6 is attached to an object side L1-tip portion of the lens unit 2. Furthermore, a weight 19 is fixed to an outer circumferential side of the holder cylinder part 11 to adjust the barycentric position of the optical unit 1 with rolling correction function configuring a movable member.

As illustrated in FIGS. 2 to 4, the holder 300 includes: a holder main body 310 that is formed with a holding hole 311 in a circular shape in which the holder cylinder part 11 of the optical unit 1 with rolling correction function is held; a pair of wall parts 301 and 302 that are respectively provided on X direction sides of the holder cylinder part 11 held in the holding hole 311; and a pair of wall parts 303 and 304 that are respectively provided on Y direction sides of the holder cylinder part 11. The holder 300 is supported by the gimbal mechanism 500 such that the holder 300 is able to swing on a first axis R1 orthogonal to the optical axis L direction (Z direction) and is able to swing on a second axis R2 orthogonal to the optical axis L direction and the first axis R1. The first axis R1 and the second axis R2 face diagonally at 45 degrees relative to the X direction and the Y direction. The optical unit 1 with rolling correction function is fixed to the holder 300, thereby swinging together with the holder 300. In other words, the optical unit 1 with rolling correction function and the holder 300 configure the movable member.

As illustrated in FIGS. 1 and 2, the supporting member 400 includes: a cylindrical casing 410 whose external shape is substantially octagonal when the cylindrical casing 410 is seen from the optical axis L direction; an object-side casing 420 that is attached to the cylindrical casing 410 from the object side L1; and a counter object-side casing 430 that is attached to the cylindrical casing 410 from the counter object side L2. At a center of the object-side casing 420, there is formed an opening part 421 in a circular shape in which an object side L1-tip portion of the optical unit 1 with rolling correction function is arranged. Furthermore, two second swing supporting parts 502 (to be described later) of the gimbal mechanism 500 are formed on the object-side casing 420 at opposite positions across the opening part 421. A notch 411 is formed in the cylindrical casing 410 by cutting out a −X direction-side surface of the cylindrical casing 410 from the counter object side L2. A notch 412 is also formed in the cylindrical casing 410 by cutting out a +X direction-side surface of the cylindrical casing 410 from the counter object side L2.

The gimbal mechanism 500 is configured between the holder 300 and the supporting member 400. The gimbal mechanism 500 includes: first swing supporting parts 501 that are provided on the holder main body 310 at diagonal positions on the first axis R1; the second swing supporting parts 502 that are provided on the supporting member 400 at diagonal positions on the second axis R2 in the object-side casing 420; and a movable frame 503 that is supported by the first swing supporting parts 501 and the second swing supporting parts 502. The movable frame 503 includes four fulcrum parts provided at positions around the optical axis, and metallic balls (not illustrated) are fixed by way of welding, etc. to outside surfaces of the respective fulcrum parts. The balls respectively make point-contact with contact springs 505 that are held by the first swing supporting parts 501, which are provided on the holder 300, and by the second swing supporting parts 502, which are provided on the supporting member 400. Therefore, the movable frame 503 is supported such that the movable frame 503 is able to rotate on each of the two directions (i.e., the first axis R1 direction and the second axis R2 direction), which are orthogonal to the optical axis L direction.

The swing magnetic driving mechanism 600 includes four pairs of magnetic driving mechanisms 601 that are provided between the holder 300 and the supporting member 400. Each of the magnetic driving mechanisms 601 includes a magnet 602 and a coil 603. The coils 603 are held on outside surfaces of the wall parts 301 to 304 of the holder 300. The magnets 602 are held on X direction-side inside surfaces of the cylindrical casing 410 of the supporting member 400 and on Y direction-side inside surfaces of the cylindrical casing 410 of the supporting member 400. The swing magnetic driving mechanism 600 is arranged on an outer circumferential-side space on the holder cylinder part 11 of the lens holder 10 in the optical unit 1 with rolling correction function.

The magnetic driving mechanism 601 in which the magnet 602 is opposed to the coil 603 is configured between the holder 300 and the supporting member 400 on each of the +X direction side, the −X direction side, the +Y direction side, and the −Y direction side. The two pairs of the magnetic driving mechanisms 601 positioned on the +Y direction side and on the −Y direction side of the holder 300 generate magnetic driving force in the same direction on the X axis when power is supplied to the coils 603. Furthermore, the two pairs of the magnetic driving mechanisms 601 positioned on the +X direction side and on the −X direction side of the holder 300 generate magnetic driving force in the same direction on the Y axis when power is supplied to the coils 603. The swing magnetic driving mechanism 600 causes the optical unit 1 with rolling correction function and the holder 300 to rotate on the first axis R1 and on the second axis R2 by way of synthesizing rotation on the X axis and rotation on the Y axis. In a case of performing shake correction on the X axis and shake correction on the Y axis, the rotation on the first axis R1 and the rotation on the second axis R2 are synthesized.

The magnetic members 700 are fixed to inside surfaces of the wall parts 301 to 304 and are opposed to the magnets 602 across the coils 603 in the radial direction. The magnetic members 700 and the magnets 602 configure magnetic springs that recover the optical unit 1 with rolling correction function being a movable member and the holder 300 to the reference posture.

(Optical Unit with Rolling Correction Function)

As illustrated in FIGS. 3 and 4, the optical unit 1 with rolling correction function includes: the lens unit 2 in which a lens 3 being an optical element is attached to a mirror cylinder 4; the lens holder 10 that holds the lens unit 2; the cap 5 that is attached to an object side L1-end portion of the lens unit 2; and the fixation member 20 that is fixed to a counter object side L2-end portion of the lens holder 10. The lens holder 10 is secured to the fixation member 20 with screw members 17, with an elastic member 18 sandwiched between the lens holder 10 and the fixation member 20.

(Lens Holder and Fixation Member)

Figure 5:
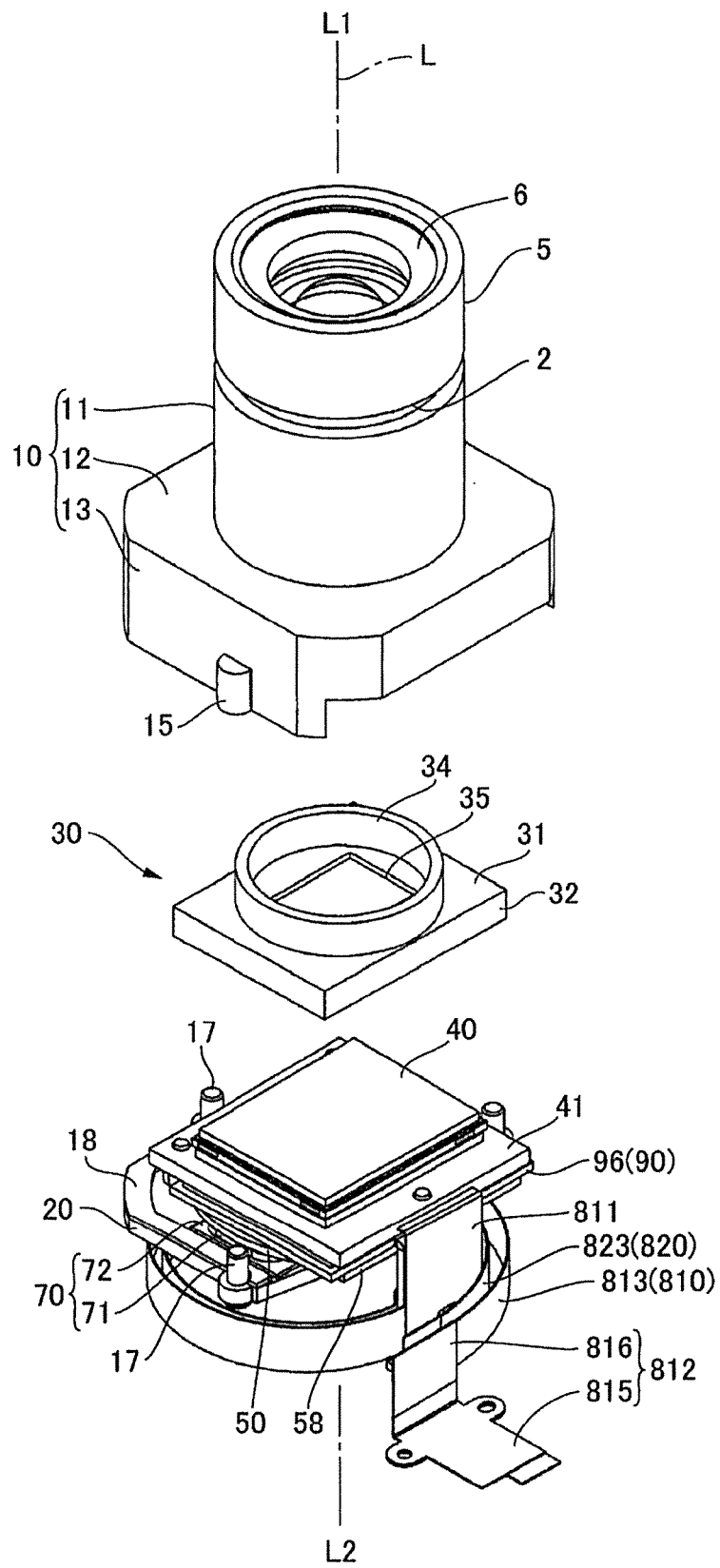
FIG. 5 is an exploded perspective view of an optical unit with rolling correction function.

FIG. 5 is an exploded perspective view of the optical unit with rolling correction function. As illustrated in FIGS. 2 to 5, the lens holder 10 includes: the holder cylinder part 11 in a cylinder shape; a stepped part 12 that expands radially outward from a counter object side L2-end portion of the holder cylinder part 11; and a side plate part 13 that extends in a cylindrical shape from an outer circumferential edge of the stepped part 12 toward the counter object side L2. As illustrated in FIGS. 3 and 4, the mirror cylinder 4 of the lens unit 2 is held on the inner circumferential side of the holder cylinder part 11. In this state, the optical axis L of the lens unit 2 corresponds to the center axis of the holder cylinder part 11 of the lens holder 10. The stepped part 12 has such a shape that the four corners of a square are cut out, when the stepped part 12 is seen from the optical axis L direction.

The side plate part 13 is formed with a cutout part 14 obtained by cutting out a counter object side L2-edge of a chamfered surface provided on one side surface of the side plate part 13 and corners on both sides of the side surface by a predetermined height. The side plate part 13 is also formed with boss parts 15 respectively provided on three side surfaces other than the side surface in which the cutout part 14 is formed.

The fixation member 20 is in a plate shape as a whole and is arranged perpendicular to the optical axis L direction. The fixation member 20 has a shape obtained by linearly cutting out a one side—(i.e., cutout part 14 side-) edge of the shape in which the side plate part 13 is seen from the optical axis L direction. Accordingly, when the fixation member 20 is fixed to a counter object side L2-end portion of the side plate part 13, an opening part 7 is formed between the cutout part 14 and the fixation member 20 such that the opening part 7 is opened on the counter object side L2 of the optical axis L direction in a direction orthogonal to the optical axis L direction (see FIG. 2). A first flexible printed circuit board 810 and a second flexible printed circuit board 820 are taken out of the optical unit 1 with rolling correction function through the opening part 7. Furthermore, a third flexible printed circuit board 830 that is connected to the coils 603 of the swing magnetic driving mechanism 600 extends from a bottom surface of the holder 300 arranged on the object side L1 of the opening part 7, toward the counter object side L2 along an outside surface of the side plate part 13. The third flexible printed circuit board 830 is drawn together with the first flexible printed circuit board 810 and the second flexible printed circuit board 820 toward the counter object side L2 of the fixation member 20. A drawn shape of each flexible printed circuit board and a structure for fixation of each flexible printed circuit board will be described later.

The elastic member 18 is sandwiched between an outer circumferential edge of the fixation member 20 and the side plate part 13 of the lens holder 10 except for a range where the cutout part 14 is formed. Therefore, a clearance between the lens holder 10 and the fixation member 20 is sealed with the elastic member 18 except for a range where the opening part 7 is formed. The fixation member 20 is formed with three protrusion parts 21 protruding radially outward at positions opposed to the boss parts 15 of the side plate part 13 in the optical axis L direction. The screw members 17 (see FIG. 4) for fixing the fixation member 20 to the lens holder 10 are inserted into screw holes formed in the protrusion parts 21 and are secured to the boss parts 15. The fixation positions with the screw members 17 are located radially outside the position where the elastic member 18 is sandwiched. The tilt of the optical axis L of the lens unit 2 held by the lens holder 10 is adjusted by adjusting the secured states of the three screw members 17. It is accordingly possible to perform tilt angle adjustment for the lens unit 2 relative to the imaging element 40.

(Internal Structure of Optical Unit with Rolling Correction Function)

As illustrated in FIGS. 3 and 4, the lens unit 2 is provided, on the counter object side L2, with: a circuit board 41 on which the imaging element 40 is mounted; a cover member 30 with which the imaging element 40 is covered from the object side L1; a heat dissipating member 90 that is in a plate shape and is arranged on the counter object side L2 of the circuit board 41; a rotation seat 50 to which the heat dissipating member 90 and the circuit board 41 are fixed; a rotation supporting mechanism 60 that supports the rotation seat 50 such that the rotation seat 50 is able to rotate on the optical axis L; and a rolling magnetic driving mechanism 70 that causes the rotation seat 50 to rotate on the optical axis L. Furthermore, as illustrated in FIGS. 4 and 5, the first flexible printed circuit board 810 and the second flexible printed circuit board 820 are drawn out toward the counter object side L2 of the rotation seat 50. The first flexible printed circuit board 810 and the second flexible printed circuit board 820 are drawn annularly with respect to the optical axis L on the counter object side L2 of the fixation member 20.

(Cover Member)

As illustrated in FIG. 5, the cover member 30 includes: an end plate part 31 that is in a substantially rectangular shape and covers the imaging element 40 from the object side L1; a side plate part 32 that protrudes from an outer circumferential edge of the end plate part 31 toward the counter object side L2; and a cylinder part 34 that is in cylindrical shape, is located radially inside the outer circumferential edge of the end plate part 31, and rises toward the object side L1. An aperture 35 is formed on an inner circumferential side of the cylinder part 34 and at a center of the end plate part 31 to define a light incoming region to the imaging element 40. Light from the lens unit 2 is incident on the imaging element 40 through the aperture 35. The position and shape of the aperture 35 are determined in accordance with the imaging element 40. In this embodiment, the aperture 35 is in a rectangular shape since the imaging element 40 is in a rectangular shape when the imaging element 40 is seen from the optical axis L direction.

As illustrated in FIGS. 3 and 4, the end plate part 31 of the cover member 30 is abutted against an outer circumferential edge of the circuit board 41 from the object side L1. Therefore, the imaging element 40 except the aperture 35 is covered from the outside. The cylinder part 34 enclosing the aperture 35 and rising toward the object side L1 has an outer circumferential surface that is opposed in the radial direction to an inner circumferential surface of the holder cylinder part 11 with a predetermined clearance. Furthermore, the end plate part 31 of the cover member 30 is opposed in the optical axis L direction to the stepped part 12 of the lens holder 10 with a predetermined clearance on an outer circumferential side of the cylinder part 34. In other words, a bent and narrow clearance is formed between the lens holder 10 and the cover member 30 to form a labyrinth structure.

(Structure for Fixation of Circuit Board, Heat Dissipating Member, and Rotation Shaft to Rotation Seat)

Figure 6:
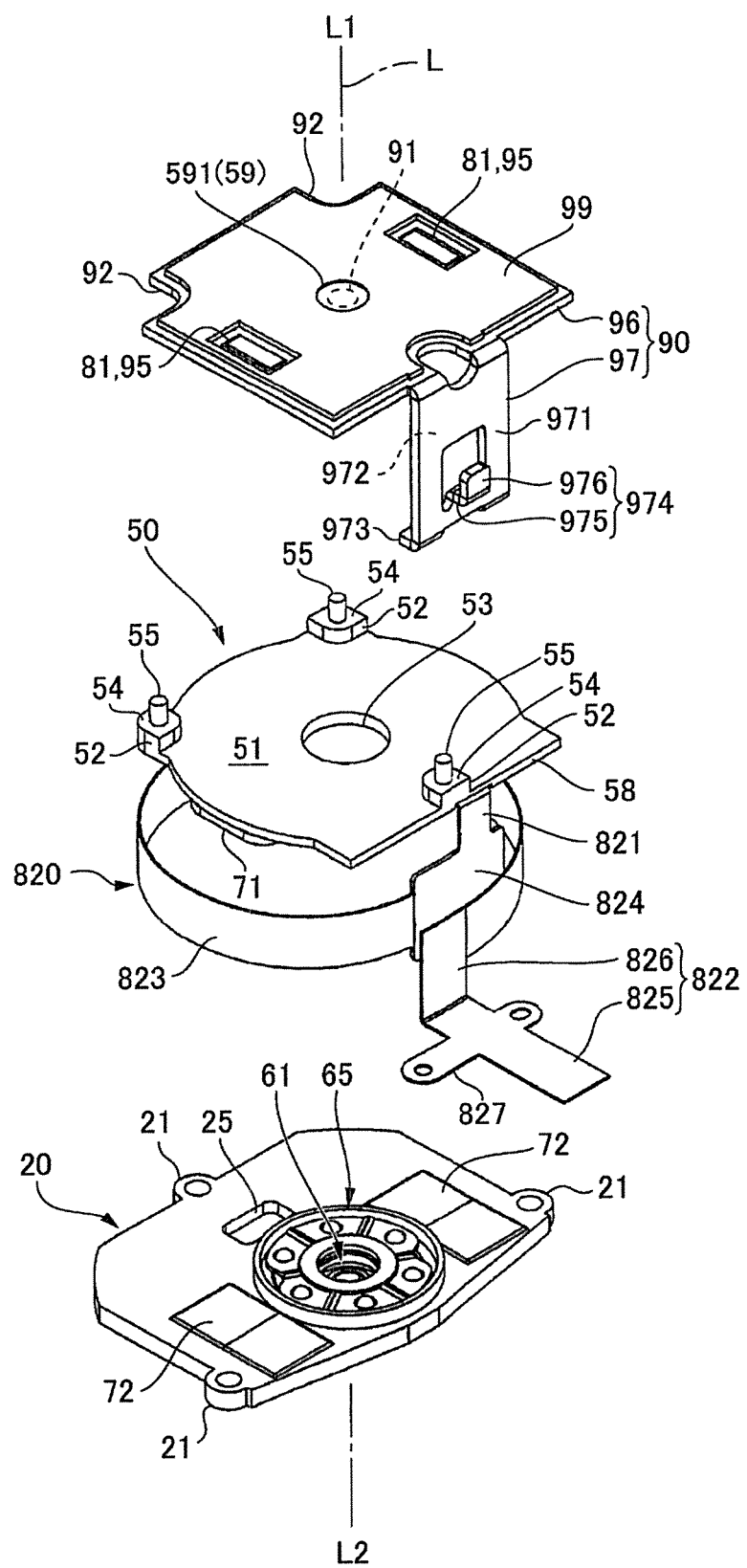
FIG. 6 is an exploded perspective view of a heat dissipating member, a rotation seat, a fixation member, a second flexible printed circuit board, a rolling magnetic driving mechanism, and a rotation supporting mechanism, in which the heat dissipating member, the rotation seat, the fixation member, the second flexible printed circuit board, the rolling magnetic driving mechanism, and the rotation supporting mechanism are seen from an object side.
Figure 7:
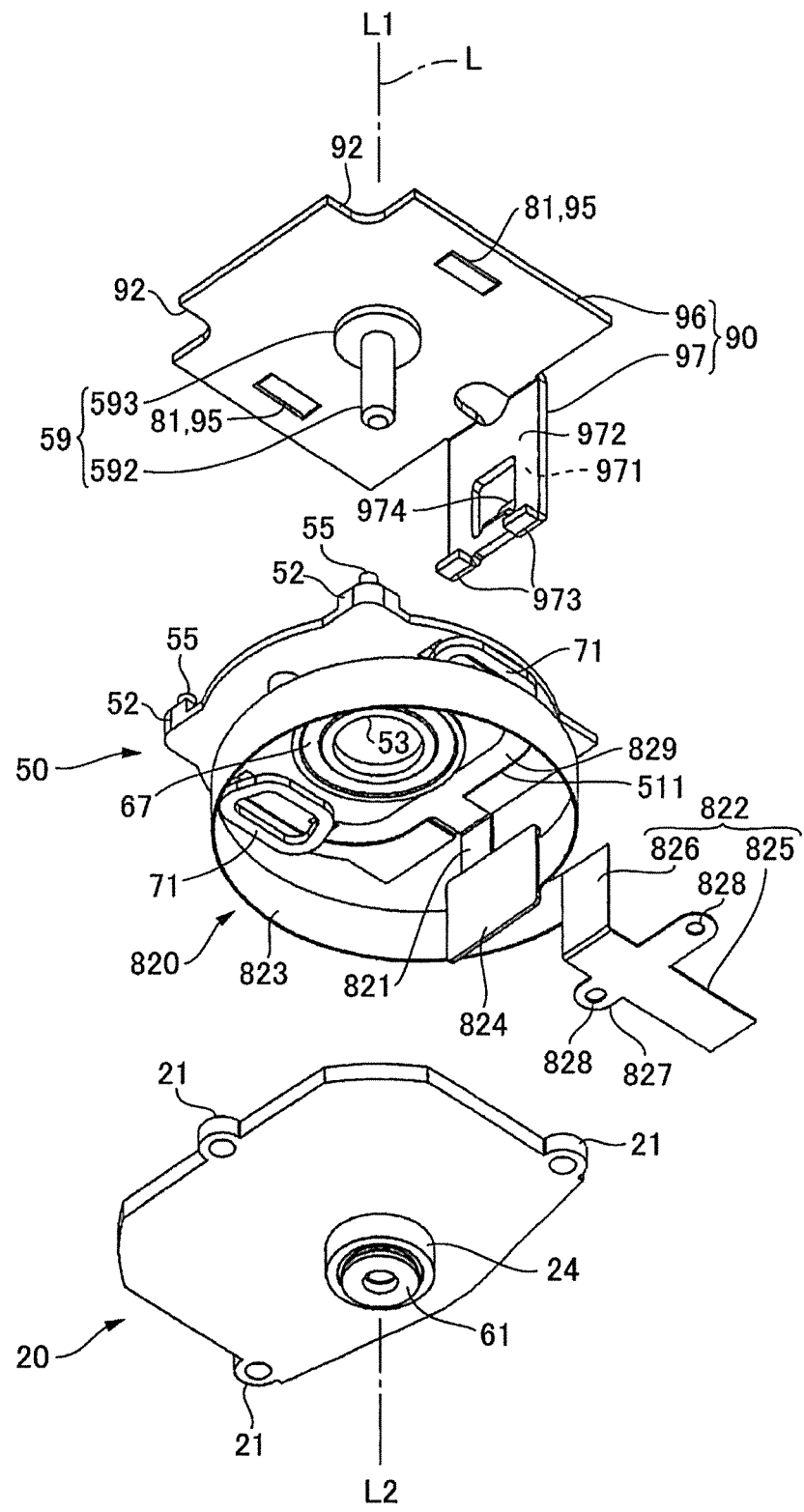
FIG. 7 is an exploded perspective view of the heat dissipating member, the rotation seat, the fixation member, the second flexible printed circuit board, the rolling magnetic driving mechanism, and the rotation supporting mechanism, in which the heat dissipating member, the rotation seat, the fixation member, the second flexible printed circuit board, the rolling magnetic driving mechanism, and the rotation supporting mechanism are seen from a counter object side.

FIG. 6 is an exploded perspective view of the heat dissipating member, the rotation seat, the fixation member, the second flexible printed circuit board, the rolling magnetic driving mechanism, and the rotation supporting mechanism, in which the heat dissipating member, the rotation seat, the fixation member, the second flexible printed circuit board, the rolling magnetic driving mechanism, and the rotation supporting mechanism are seen from the object side L1. FIG. 7 is an exploded perspective view of the heat dissipating member, the rotation seat, the fixation member, the second flexible printed circuit board, the rolling magnetic driving mechanism, and the rotation supporting mechanism, in which the heat dissipating member, the rotation seat, the fixation member, the second flexible printed circuit board, the rolling magnetic driving mechanism, and the rotation supporting mechanism are seen from the counter object side L2. As illustrated in FIG. 6, the rotation seat 50 includes: a heat dissipating member fixation surface 51 that is directed to the object side L1; and three circuit board fixation parts 52 that protrude from an outer circumferential edge of the heat dissipating member fixation surface 51 toward the object side L1. Furthermore, the rotation seat 50 is formed with a circular hole 53 that passes through a center of the heat dissipating member fixation surface 51. The heat dissipating member fixation surface 51 is a surface perpendicular to the optical axis L.

As illustrated in FIGS. 6 and 7, the rotation seat 50 is formed with an edge part 58 that is in a rectangular shape and projects from an outer circumferential side of the rotation seat 50 at an angular position where the opening part 7 between the lens holder 10 and the fixation member 20 is provided (i.e., an angular position on the side where the fixation member 20 is cut out). A radially outside end edge of the edge part 58 is in a linear shape orthogonal to the radial direction. The heat dissipating member fixation surface 51 has an external shape that is in a substantially circular shape except for an angular position where the edge part 58 is formed. One of the three circuit board fixation parts 52 formed on the outer circumferential edge of the heat dissipating member fixation surface 51 is formed at a center of the edge part 58. Each of the three circuit board fixation parts 52 is formed with a circuit board fixation surface 54, and a circuit board fixation projection part 55 protruding from the circuit board fixation surface 54.

The heat dissipating member 90 includes: a heat dissipating member main body 96 that is in a plate shape perpendicular to the optical axis L; and a protrusion part 97 that is bent at an opening part 7-side edge of the heat dissipating member main body 96 and extends toward the counter object side L2. The heat dissipating member main body 96 has an external shape that is in a substantially rectangular shape, and is formed with three notches 92 at positions overlapping with the circuit board fixation parts 52. The protrusion part 97 of the heat dissipating member 90 is provided at the same angular position as the edge part 58 of the rotation seat 50.

A rotation shaft 59 of the rotation supporting mechanism 60 is fixed to the heat dissipating member main body 96. Therefore, when the heat dissipating member 90 is fixed to the rotation seat 50, the rotation shaft 59 is fixed to the rotation seat 50 via the heat dissipating member 90. As illustrated in FIG. 3, the rotation shaft 59 includes: a fixation part 591 that is fixed to the heat dissipating member main body 96; and a shaft part 592 that protrudes from the fixation part 591 toward the counter object side L2. The fixation part 591 includes: a flange part 593 that is larger in diameter than the shaft part 592; and a projection part 594 that protrudes from a center of the flange part 593 toward the object side L1. A rotation shaft fixation hole 91 in a circular shape is formed in a center of the heat dissipating member 90. The rotation shaft 59 is fixed to the heat dissipating member 90 by crimping the projection part 594 inserted into the rotation shaft fixation hole 91. The flange part 593 is abutted against the heat dissipating member 90 from the counter object side L2, on an outer circumferential side of the rotation shaft fixation hole 91. Note that the rotation shaft 59 may be fixed by press-fitting or laser welding rather than crimping.

Figure 8A:
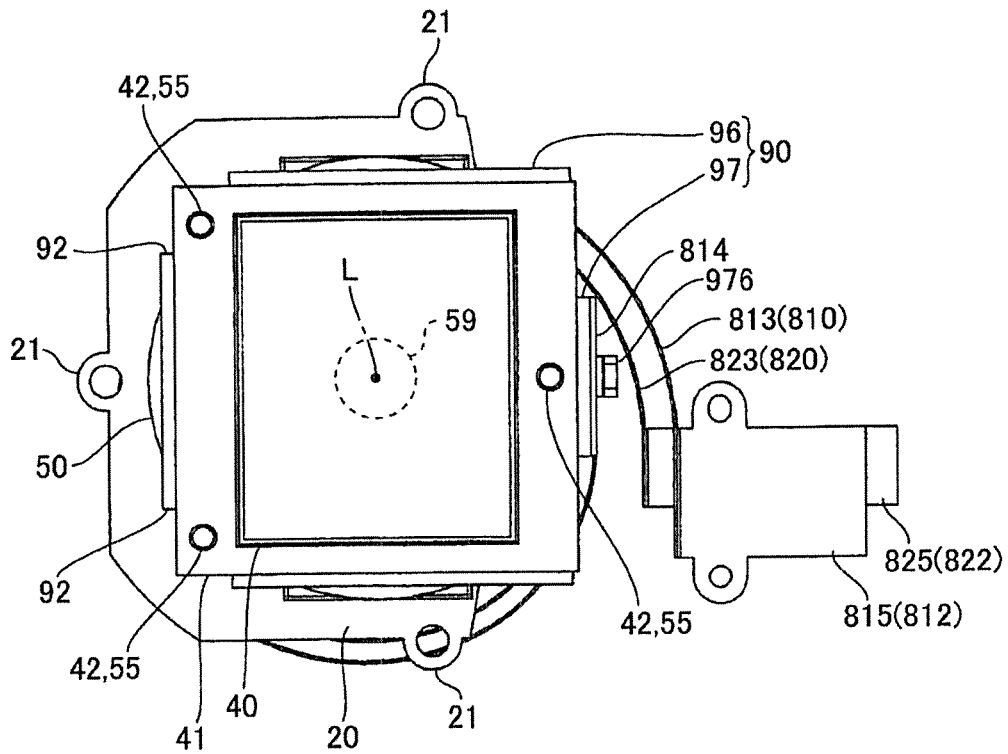
FIGS. 8A and 8B are explanatory diagrams of a structure for attaching the heat dissipating member and a circuit board.
Figure 8B:
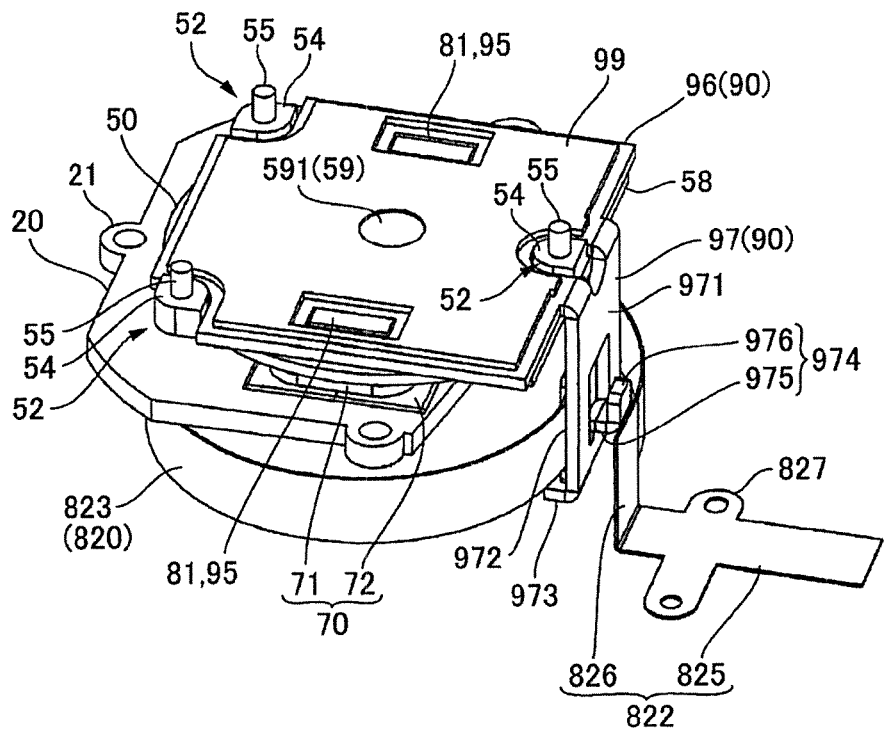

FIGS. 8A and 8B are explanatory diagrams of a structure for attaching the heat dissipating member 90 and the circuit board 41. Specifically, FIG. 8A is a plan view of a state where the heat dissipating member 90 and the circuit board 41 are attached to the rotation seat 50, in which the state is seen from the object side L1. FIG. 8B is a perspective view of a state where the heat dissipating member 90 is attached to the rotation seat 50. The circuit board fixation parts 52 of the rotation seat 50 are respectively fitted to the three notches 92 in the heat dissipating member main body 96, and the flange part 593 of the rotation shaft 59 fixed at the center of the heat dissipating member main body 96 is arranged in the circular hole 53 in the rotation seat 50, so that the heat dissipating member 90 is attached in a state where the heat dissipating member main body 96 is abutted against the heat dissipating member fixation surface 51 from the object side L1.

The circuit board 41, on which the imaging element 40 is mounted, is formed with three fixation holes 42 at positions overlapping with the circuit board fixation projection parts 55. As illustrated in FIG. 8A, when the circuit board fixation projection parts 55 are fitted to the fixation holes 42 in the circuit board 41, and an end portion of the circuit board 41 is abutted against the circuit board fixation surfaces 54, the circuit board 41 is fixed to the rotation seat 50 in a state where the circuit board 41 comes into contact with a surface of a heat conductive sheet 99 that is affixed to an object side L1-surface of the heat dissipating member 90 (see FIGS. 3 and 4). The heat dissipating member 90 and the circuit board 41 are thus fixed to the rotation seat 50. The shaft part 592 of the rotation shaft 59 protrudes from the circular hole 53 in the rotation seat 50 toward the counter object side L2, and is held by a bearing part 61 provided on the fixation member 20, such that the shaft part 592 is able to rotate. A tip portion of the rotation shaft 59 protrudes from the bearing part 61 toward the counter object side L2.

The heat dissipating member 90 is a plate member that is made of nonmagnetic metal such as aluminum or copper. Heat generated from the imaging element 40 is transmitted from the circuit board 41 to the heat dissipating member 90 via the heat conductive sheet 99. The heat conductive sheet 99 may be configured to form a heat conductive layer between the circuit board 41 and the heat dissipating member 90. For example, the heat conductive sheet 99 may be a rubber sheet with good heat conductivity. Alternatively, a heat conductive layer may be formed by applying a gel paste with good conductivity or a heat conductive adhesive to a surface of the heat dissipating member 90. The rotation seat 50 is a filler-containing resin member, which exhibits good heat conductivity. For example, the rotation seat 50 may be a resin member containing glass fiber reinforcing material and high-heat conductive filler. In this embodiment, the rotation shaft 59 may also be a filler-containing resin member. Since the rotation shaft 59 is fixed to the heat dissipating member 90, heat from the heat dissipating member 90 is efficiently transmitted to the rotation shaft 59. Note that only one of the rotation shaft 59 and the rotation seat 50 may be a filler-containing resin member.

In this embodiment, as illustrated in FIG. 8A, the imaging element 40 mounted on the circuit board 41 overlaps with the heat dissipating member 90 and the rotation shaft 59 at an identical position when the imaging element 40 is seen from the optical axis L direction. Furthermore, the heat dissipating member 90 is larger in dimensions than the imaging element 40. The entire imaging element 40 therefore overlaps with the heat dissipating member 90 and the rotation shaft 59 when the imaging element 40 is seen from the optical axis L direction. The heat dissipating member 90 has an outer circumferential edge projecting from the outer circumferential edge of the circuit board 41 toward an outer circumferential side, except for the positions where the three notches 92 overlapping with the circuit board fixation parts 52 are formed. In other words, the outer circumferential edge of the heat dissipating member 90 is exposed from the circuit board 41 and the rotation seat 50 and is out of contact with the other members. It is accordingly possible to dissipate heat from this exposed portion.

As illustrated in FIGS. 6 and 7, the heat dissipating member main body 96 is formed with two magnetic member arrangement holes 95 to which magnetic members 81 are mounted. The magnetic member arrangement holes 95 are located radially outside the rotation shaft 59 at symmetrical positions with respect to the optical axis L. The two magnetic member arrangement holes 95 are formed at the symmetrical positions with respect to the optical axis L. The magnetic members 81 configure magnetic springs (posture recovering mechanism 80) that recover the rotation seat 50 to a reference position of rotation, as will be described later.

(Rotation Supporting Mechanism)

As illustrated in FIGS. 3 and 4, a bearing holding part 22 is formed at a radial center of the fixation member 20. The bearing holding part 22 has a holding hole 23 that penetrates the fixation member 20 in the optical axis L direction. As illustrated in FIG. 7, an annular protrusion part 24 is formed on a counter object side L2-surface of the fixation member 20 such that the annular protrusion part 24 encloses the holding hole 23 and rises toward the counter object side L2. The rotation supporting mechanism 60 includes: the rotation shaft 59 that is fixed to the rotation seat 50; the bearing part 61 that is held by the bearing holding part 22; and a rotation supporting part 65 that is configured between the fixation member 20 and the rotation seat 50 radially outside the bearing part 61. In other words, the rotation supporting mechanism 60 is configured with two pairs of rotation supporting parts including: the rotation shaft 59; and bearing part 61 and the rotation supporting part 65.

Figure 9A:
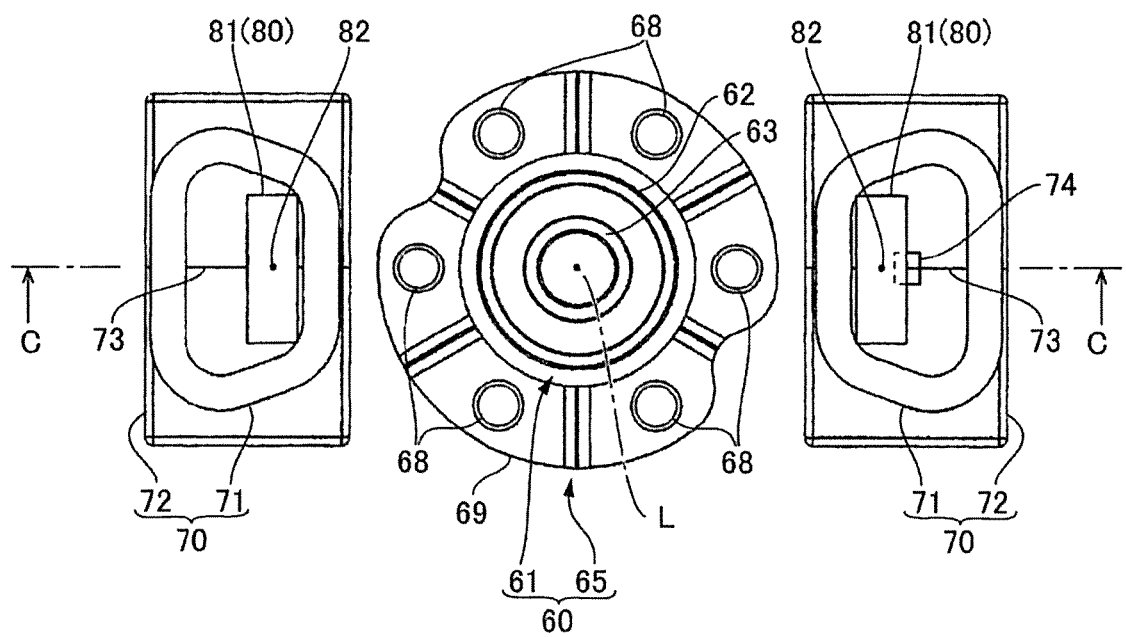
FIGS. 9A and 9B are explanatory diagrams of the rolling magnetic driving mechanism and the rotation supporting mechanism.
Figure 9B:
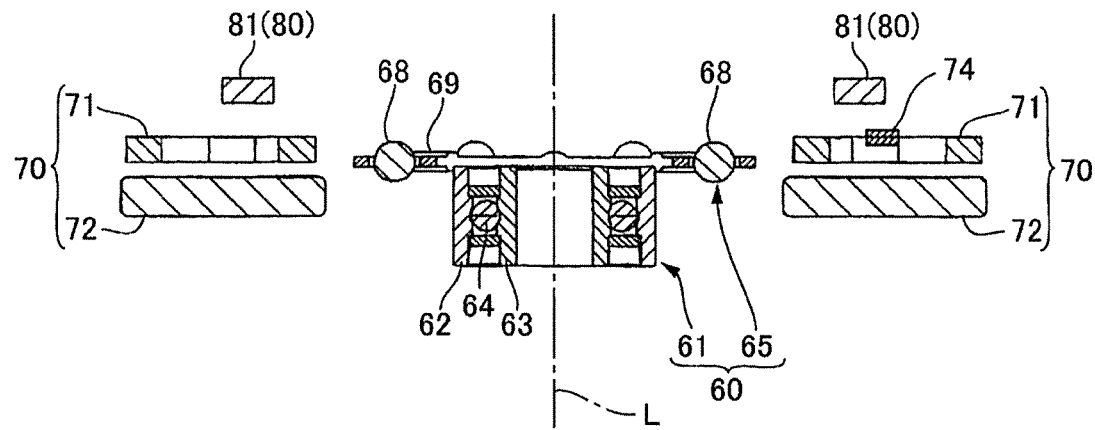

FIG. 9A is a plan view of the rolling magnetic driving mechanism 70 and the rotation supporting mechanism 60. FIG. 9B is a cross-sectional view taken along a line C-C of FIG. 9A. As illustrated in FIG. 9B, the bearing part 61 includes: an outer ring 62 that is fixed to an inner circumferential surface of the holding hole 23 in the fixation member 20; an inner ring 63 that is fixed to an outer circumferential surface of the rotation shaft 59; and balls 64 that are arranged between the outer ring 62 and the inner ring 63. As illustrated in FIGS. 3 and 4, the tip portion of the rotation shaft 59 protrudes from the inner ring 63 of the bearing part 61 toward the counter object side L2. The tip portion of the rotation shaft 59 protrudes toward the counter object side L2 relative to the annular protrusion part 24 formed on the fixation member 20. The rotation supporting part 65 includes: a fixation member-side annular groove 66 that is formed in an object side L1-surface of the fixation member 20; a rotational member-side annular groove 67 that is formed in a counter object side L2-surface of the rotation seat 50; a roll moving member 68 that is arranged between the fixation member-side annular groove 66 and the rotational member-side annular groove 67; and a retainer 69 that holds the roll moving member 68 between the fixation member-side annular groove 66 and the rotational member-side annular groove 67.

The fixation member-side annular groove 66 is formed radially outside an outer circumferential surface of the outer ring 62 of the bearing part 61. Therefore, a bottom surface of the fixation member-side annular groove 66 is at a position depressed toward the counter object side L2 relative to an object side L1-end surface of the outer ring 62 of the bearing part 61. Furthermore, the rotation supporting part 65 has a structure in that the fixation member-side annular groove 66 is opposed to the rotational member-side annular groove 67 in the optical axis L direction. Therefore, the thickness of the rotation supporting part 65 in the optical axis L direction is smaller than the thickness of the bearing part 61 in the optical axis L direction. Accordingly, the rotation supporting mechanism 60 is structured to have a lower height in the optical axis L direction as compared with the configuration in which two pairs of ball bearings like the bearing part 61 are stacked and arranged in the optical axis L direction.

(Rolling Magnetic Driving Mechanism)

The plan view of FIG. 9A illustrates the rolling magnetic driving mechanism 70 in a case where the rotation seat 50 is at the reference position of rotation. As illustrated in FIG. 3, when the rotation shaft 59 fixed to the rotation seat 50 via the heat dissipating member 90 is held to be able to rotate via the bearing part 61 attached to the bearing holding part 22, the rolling magnetic driving mechanism 70 is configured between the rotation seat 50 and the fixation member 20. The rolling magnetic driving mechanism 70 includes: a pair of coils 71 that are arranged on both sides in the radial direction across the rotation shaft 59 fixed to the rotation seat 50; and a pair of magnets 72 that are arranged on both sides in the radial direction across the bearing holding part 22 of the fixation member 20. The coils 71 are opposed to the magnets 72 with a predetermined gap in the optical axis L direction.

As illustrated in FIG. 9A, each of the magnets 72 is separated into two with respect to the circumferential direction and is magnetized such that the magnetic poles on surfaces opposed to the coils 71 are different with reference to a magnetization polarized line 73 extending in the radial direction. The coils 71 are coreless coils, and long edge portions extending in the radial direction are utilized as effective edges. A Hall element 74 is arranged inside one of the coils 71. The Hall element 74 is fixed to the second flexible printed circuit board 820 that supplies power to the coils 71. The Hall element 74 is opposed to the magnetization polarized line 73 of the magnets 72 when the rotation seat 50 is at a predetermined reference position of rotation. The rolling magnetic driving mechanism 70 is controlled based on an origin position in a rolling direction detected based on a signal from the Hall element 74. The rolling magnetic driving mechanism 70 thus performs rolling correction by rotating a rotation member 1A (see FIGS. 3 and 4) including the cover member 30, the imaging element 40, the circuit board 41, and the heat dissipating member 90 each fixed to the rotation seat 50, on the optical axis L. In other words, the optical unit 1 with rolling correction function performs the rolling correction by rotating the small rotation member 1A not including the lens unit 2 and the lens holder 10.

As illustrated in FIG. 4, the rotation seat 50 is formed with a rotation restraining projection part 512 that protrudes toward the fixation member 20. Furthermore, the fixation member 20 is formed with a rotation restraining depression part 25 into which a tip portion of the rotation restraining projection part 512 is inserted. As illustrated in FIG. 6, the rotation restraining depression part 25 extends over a predetermined angle range in the circumferential direction. The rotation restraining projection part 512 and the rotation restraining depression part 25 configure a rotation retraining part that restrains the rotation range of the rotation seat 50 (i.e., the rotation range for rolling correction) relative to the fixation member 20.

(Posture Recovering Mechanism)

The optical unit 1 with rolling correction function includes the posture recovering mechanism 80 the recovers the rotation seat 50 to the predetermined reference position of rotation. The posture recovering mechanism 80 includes two pairs of magnetic springs configured with the two magnetic members 81 fixed to the rotation seat 50, and the two magnets 72 configuring the rolling magnetic driving mechanism 70. As described above, the magnetic members 81 are respectively arranged in the magnetic member arrangement holes 95 in the heat dissipating member 90. The magnetic members 81 are opposed to the magnets 72 across the coils 71 in the optical axis L direction. As illustrated in FIG. 9A, the magnetic members 81 are in a rectangular shape of which the circumferential dimensions are longer than the radial dimensions. On condition that the rotation seat 50 is at the reference position of rotation, circumferential centers 82 of the magnetic members 81 are at positions overlapping with the magnetization polarized line 73 of the magnets 72 when the magnetic members 81 are seen from the optical axis L direction.

When the rotation seat 50 rotates from the reference position of rotation, the centers 82 of the magnetic members 81 move away from the magnetization polarized line 73 of the magnets 72 in the circumferential direction. Therefore, magnetic attractive force in such a direction that the centers 82 of the magnetic members 81 correspond to the angular position of the magnetization polarized line 73 of the magnets 72 is exerted between the magnetic members 81 and the magnets 72. In other words, when the rotation seat 50 moves away from the reference position of rotation, magnetic attractive force in such a direction as to recover the rotation seat 50 to the reference position of rotation is exerted on the posture recovering mechanism 80. This embodiment employs the two pairs of the magnetic springs each including the magnetic member 81 and the magnet 72, but may employ one pair of the magnetic springs. In other words, the number of magnetic members 81 may be one. Furthermore, the rolling magnetic driving mechanism 70 may include at least one pair of the coil 71 and the magnet 72.

(Structure for Fixation of Flexible Printed Circuit Board)

The optical unit 1 with rolling correction function includes: the first flexible printed circuit board 810 for the imaging element 40; and the second flexible printed circuit board 820 that is connected to the coils 71 of the rolling magnetic driving mechanism 70. The optical unit 100 with triaxial shake correction function includes, in addition to the two flexible printed circuit boards of the optical unit 1 with rolling correction function, the third flexible printed circuit board 830 that is connected to the coils 603 of the swing magnetic driving mechanism 600. These three flexible printed circuit boards are drawn between the supporting member 400 and the optical unit 1 with rolling correction function so as not to hinder the rotation member 1A including the rotation seat 50 from rotating on the optical axis L and so as not to hinder the optical unit 1 with rolling correction function from swinging on an axis orthogonal to the optical axis L.

As illustrated in FIG. 4, the fixation member 20 configures a counter object side L2-end surface of the optical unit 1 with rolling correction function. The counter object-side casing 430 (counter object-side member) is arranged on the counter object side L2 of the fixation member 20 with a predetermined clearance between the counter object-side casing 430 and the fixation member 20. Accordingly, a counter object-side space S having a predetermined height in the optical axis L direction is provided between the fixation member 20 and the counter object-side casing 430. The first flexible printed circuit board 810, the second flexible printed circuit board 820, and the third flexible printed circuit board 830 each passing the outer circumferential side of the fixation member 20 are drawn onto the counter object-side space S, and then are wound in the circumferential direction with respect to the optical axis L at the counter object-side space S. The first flexible printed circuit board 810, the second flexible printed circuit board 820, and the third flexible printed circuit board 830 are then fixed to a supporting member-side fixation part 440 provided on an edge of the counter object-side casing 430, and are drawn out of the supporting member 400 through the notch 412 in the cylindrical casing 410. The supporting member-side fixation part 440 includes: a supporting member-side fixation surface 441 that is perpendicular to the optical axis L; and two projection parts 442 that protrude from the supporting member-side fixation surface 441 toward the object side L1. The projection parts 442 are spaced apart from each other in the circumferential direction.

As illustrated in FIG. 5, the first flexible printed circuit board 810 for the imaging element 40 is connected to an edge of the circuit board 41 on which the imaging element 40 is mounted. The edge of the circuit board 41, to which the first flexible printed circuit board 810 is connected, is opposed to the opening part 7 formed between the cutout part 14 of the lens holder 10 and the fixation member 20. The first flexible printed circuit board 810 is bent toward the counter object side L2 at the edge of the circuit board 41. The first flexible printed circuit board 810 passes radially outside the edge part 58 of the rotation seat 50 and extends toward the counter object side L2 of the fixation member 20.

Figure 10:
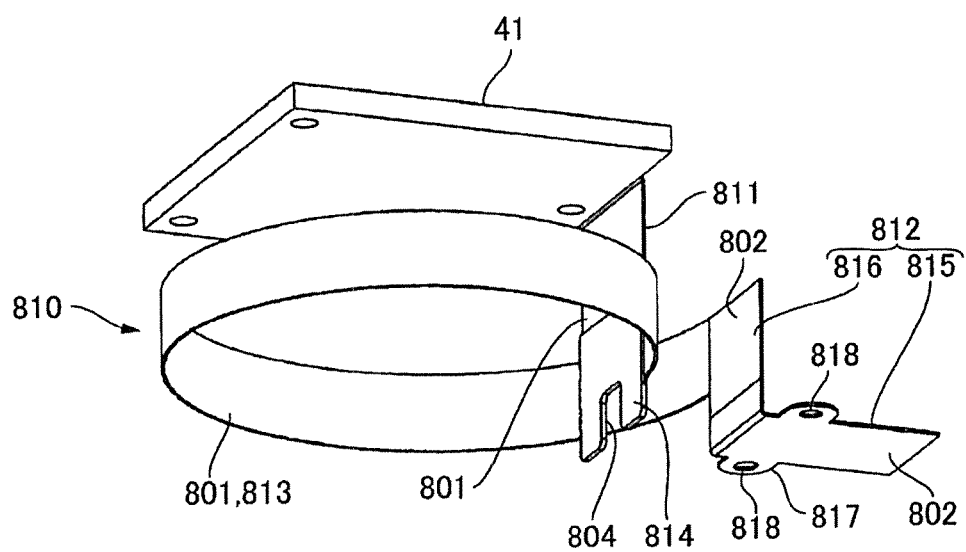
FIG. 10 is a perspective view of a first flexible printed circuit board.

FIG. 10 is a perspective view of the first flexible printed circuit board 810 and the circuit board 41. The first flexible printed circuit board 810 includes: a first circuit board portion 811 that is connected to the circuit board 41; a second circuit board portion 812 that is provided on an end portion opposite from the first circuit board portion 811; and a connection part 813 that connects the first circuit board portion 811 to the second circuit board portion 812. The first circuit board portion 811 is bent at the edge of the circuit board 41 and extends linearly toward the counter object side L2. The first circuit board portion 811 has, on its counter object side L2-tip portion, a first reinforcing part 814 including a flexible circuit board 801 and a reinforcing plate 802 fixed to the flexible circuit board 801.

The second circuit board portion 812 includes: a fixation portion 815 that is fixed to the supporting member-side fixation surface 441 of the supporting member-side fixation part 440; and a rising part 816 that is bent at a substantially right angle from a radially inside end portion of the fixation portion 815 perpendicular to the optical axis L and rises toward the object side L1. As with the first reinforcing part 814, each of the fixation portion 815 and the rising part 816 includes a flexible circuit board 801 and a reinforcing plate 802 fixed to the flexible circuit board 801. The fixation portion 815 includes a wide-width part 817 having protrusion portions protruding from circumferential ends of the fixation portion 815. The wide-width part 817 is formed with two engagement parts 818 at positions overlapping with the projection parts 442 of the supporting member-side fixation part 440 such that the projection parts 442 are fitted to the engagement parts 818. Each of the engagement parts 818 is a through hole penetrating the reinforcing plate 802.

Each of the first reinforcing part 814 and the rising part 816 has a circuit board surface that is perpendicular to the radial direction. The connection part 813 has: one end that is connected to one of circumferential end edges of the first reinforcing part 814; and the other end that is connected to the other circumferential end edge of the rising part 816. The connection part 813 is configured with the flexible circuit board 801 and is connected to be flush with the circuit board surfaces of the first reinforcing part 814 and rising part 816. The connection part 813 is wound with respect to the optical axis L at an outer circumferential side of the rotation shaft 59.

As illustrated in FIG. 7, the second flexible printed circuit board 820 for the rolling magnetic driving mechanism 70 is drawn radially outward from a fixation groove 511 formed in a counter object side L2-surface of the rotation seat 50, and is bent at an edge of the edge part 58 of the rotation seat 50 toward the counter object side L2. Furthermore, the second flexible printed circuit board 820 extends toward the counter object side L2 of the fixation member 20. Here, as illustrated in FIGS. 4 and 5, the first flexible printed circuit board 810 for the imaging element 40 is drawn radially outside the protrusion part 97 of the heat dissipating member 90 from the edge of the circuit board 41, and extends along a surface directed radially outside the protrusion part 97. On the other hand, the second flexible printed circuit board 820 for the rolling magnetic driving mechanism 70 is drawn radially inside the protrusion part 97 of the heat dissipating member 90 from the edge of the edge part 58 of the rotation seat 50, and extends along a surface directed radially inside the protrusion part 97. In other words, the first flexible printed circuit board 810 and the second flexible printed circuit board 820 are arranged opposite each other across the protrusion part 97 of the heat dissipating member 90.

Figure 11:
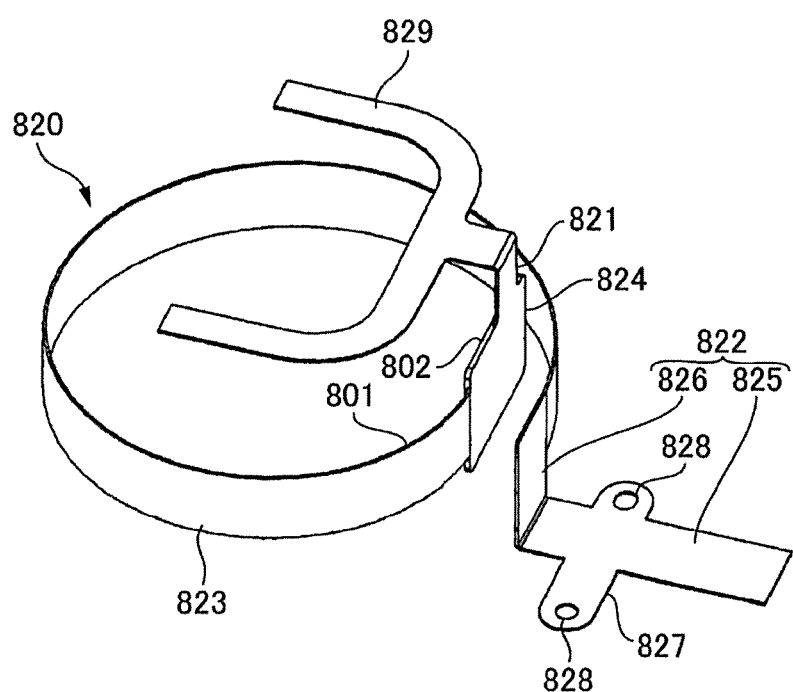
FIG. 11 is a perspective view of the second flexible printed circuit board.

FIG. 11 is a perspective view of the second flexible printed circuit board 820. The second flexible printed circuit board 820 includes: a coil connection part 829 that is arranged in the fixation groove 511 in the rotation seat 50 and extends to the coils 71; a first circuit board portion 821 that is bent at the edge of the edge part 58 of the rotation seat 50 and extends toward the counter object side L2; a second circuit board portion 822 that is fixed to the supporting member-side fixation part 440; and a connection part 823 that connects the first circuit board portion 821 to the second circuit board portion 822. The first circuit board portion 821 has, on its counter object side L2-tip portion, a second reinforcing part 824 including a flexible circuit board 801 and a reinforcing plate 802 fixed to the flexible circuit board 801. The second reinforcing part 824 is wider in circumferential width than a portion of the flexible circuit board 801 connecting the coil connection part 829 to the second reinforcing part 824, and is equal in circumferential width to the first reinforcing part 814 of the first flexible printed circuit board 810 for the imaging element 40.

In the second flexible printed circuit board 820, the connection part 823 and the second circuit board portion 822 are formed as with the connection part 813 and the second circuit board portion 812 in the first flexible printed circuit board 810 for the imaging element 40, except for a circumferential width of the second circuit board portion 822. In other words, the second circuit board portion 822 includes: a fixation portion 825 that is perpendicular to the optical axis L; and a rising part 826 that is bent at a substantially right angle from a radially inside end portion of the fixation portion 825 and rises toward the object side L1. Furthermore, the fixation portion 825 includes a wide-width part 827 that is formed with two engagement parts 828 at positions overlapping with the projection parts 442 of the supporting member-side fixation part 440 such that the projection parts 442 are fitted to the engagement parts 828.

The connection part 823 of the second flexible printed circuit board 820 is wound in the same direction as the connection part 813, at an inner circumferential side of the connection part 813 of the first flexible printed circuit board 810. Each of the second reinforcing part 824 and the rising part 826 has a circuit board surface that is perpendicular to the radial direction. The connection part 823 has: one end that is connected to one of circumferential end edges of the second reinforcing part 824; and the other end that is connected to the other circumferential end edge of the rising part 826. The connection part 823 is configured with the flexible circuit board 801 and is connected to be flush with the circuit board surfaces of the second reinforcing part 824 and rising part 826.

Figure 12:
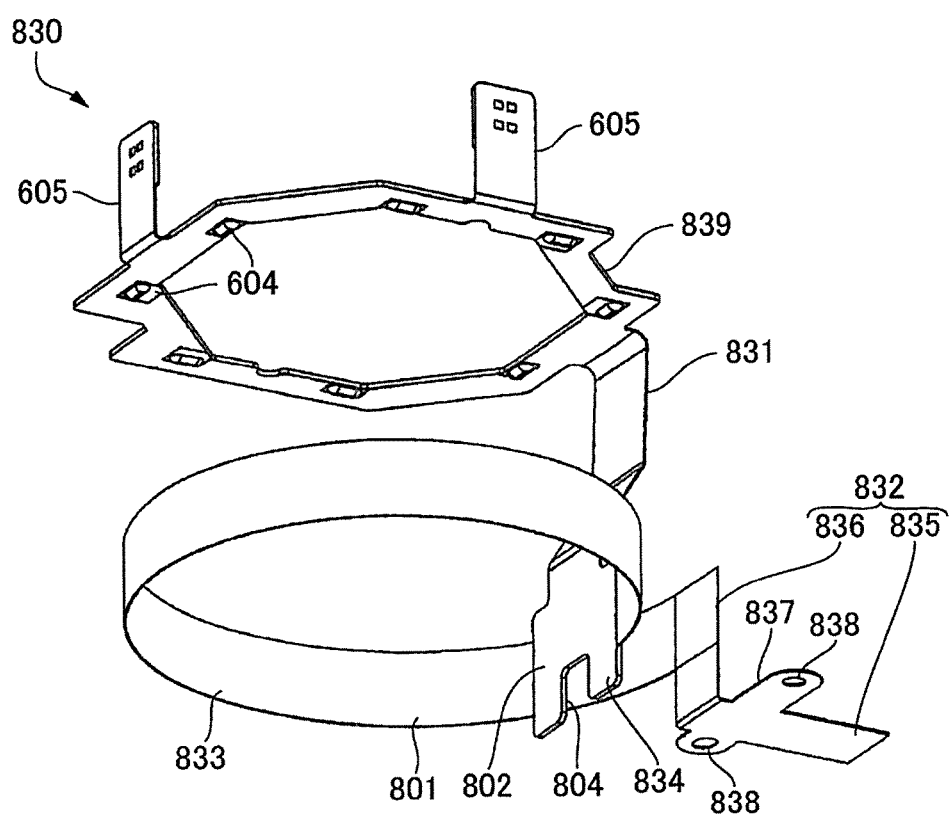
FIG. 12 is a perspective view of a third flexible printed circuit board.

FIG. 12 is a perspective view of the third flexible printed circuit board 830. The third flexible printed circuit board 830 includes: a frame part 839 that is fixed to the holder 300 holding the optical unit 1 with rolling correction function and the coils 603; a first circuit board portion 831 that is bent at an outer circumferential edge of the frame part 839 and extends toward the counter object side L2; a second circuit board portion 832 that is fixed to the supporting member-side fixation part 440; and a connection part 833 that connects the first circuit board portion 831 to the second circuit board portion 832. As illustrated in FIGS. 2 and 4, the frame part 839 includes a land 604 for connection with the coils 603, the land 604 being fixed to a counter object side L2-surface of the holder main body 310. The frame part 839 also includes two arm parts 605 that rise from the frame part 839 toward the object side L1. A Hall element is mounted on each of the arm parts 605.

In the third flexible printed circuit board 830, the first circuit board portion 831 has, on its counter object side L2-tip portion, a third reinforcing part 834 including a flexible circuit board 801 and a reinforcing plate 802 fixed to the flexible circuit board 801. The first circuit board portion 831 is drawn such that a portion of the flexible circuit board 801 connecting the third reinforcing part 834 to the frame part 839 is warped to be directed radially inward. The third reinforcing part 834 is wider in circumferential width than the portion of the flexible circuit board 801 connecting the third reinforcing part 834 to the frame part 839, and is equal in circumferential width to the first reinforcing part 814 of the first flexible printed circuit board 810 for the imaging element 40 and the second reinforcing part 824 of the second flexible printed circuit board 820 for the rolling magnetic driving mechanism 70.

In the third flexible printed circuit board 830, the connection part 833 and the second circuit board portion 832 are formed as with the connection part 823 and the second circuit board portion 822 in the second flexible printed circuit board 820 for the rolling magnetic driving mechanism 70. In other words, the second circuit board portion 832 includes: a fixation portion 835 that is perpendicular to the optical axis L; and a rising part 836 that is bent at a substantially right angle from a radially inside end portion of the fixation portion 835 and rises toward the object side L1. Furthermore, the fixation portion 835 includes a wide-width part 837 that is formed with two engagement parts 838 at positions overlapping with the projection parts 442 of the supporting member-side fixation part 440 such that the projection parts 442 are fitted to the engagement parts 838.

The connection part 833 of the third flexible printed circuit board 830 is wound in the same direction as the connection parts 813 and 823, at an outer circumferential side of the connection part 813 of the first flexible printed circuit board 810. The connection part 833 has: one end in the circumferential direction that is connected to the third reinforcing part 834; and the other end that is connected to the rising part 836. Each of the third reinforcing part 834 and the rising part 836 has a circuit board surface that is perpendicular to the radial direction. The connection part 833 has: one end that is connected to one of circumferential end edges of the third reinforcing part 834; and the other end that is connected to the other circumferential end edge of the rising part 836. The connection part 833 is configured with the flexible circuit board 801 and is connected to be flush with the circuit board surfaces of the third reinforcing part 834 and rising part 836.

Figure 13:
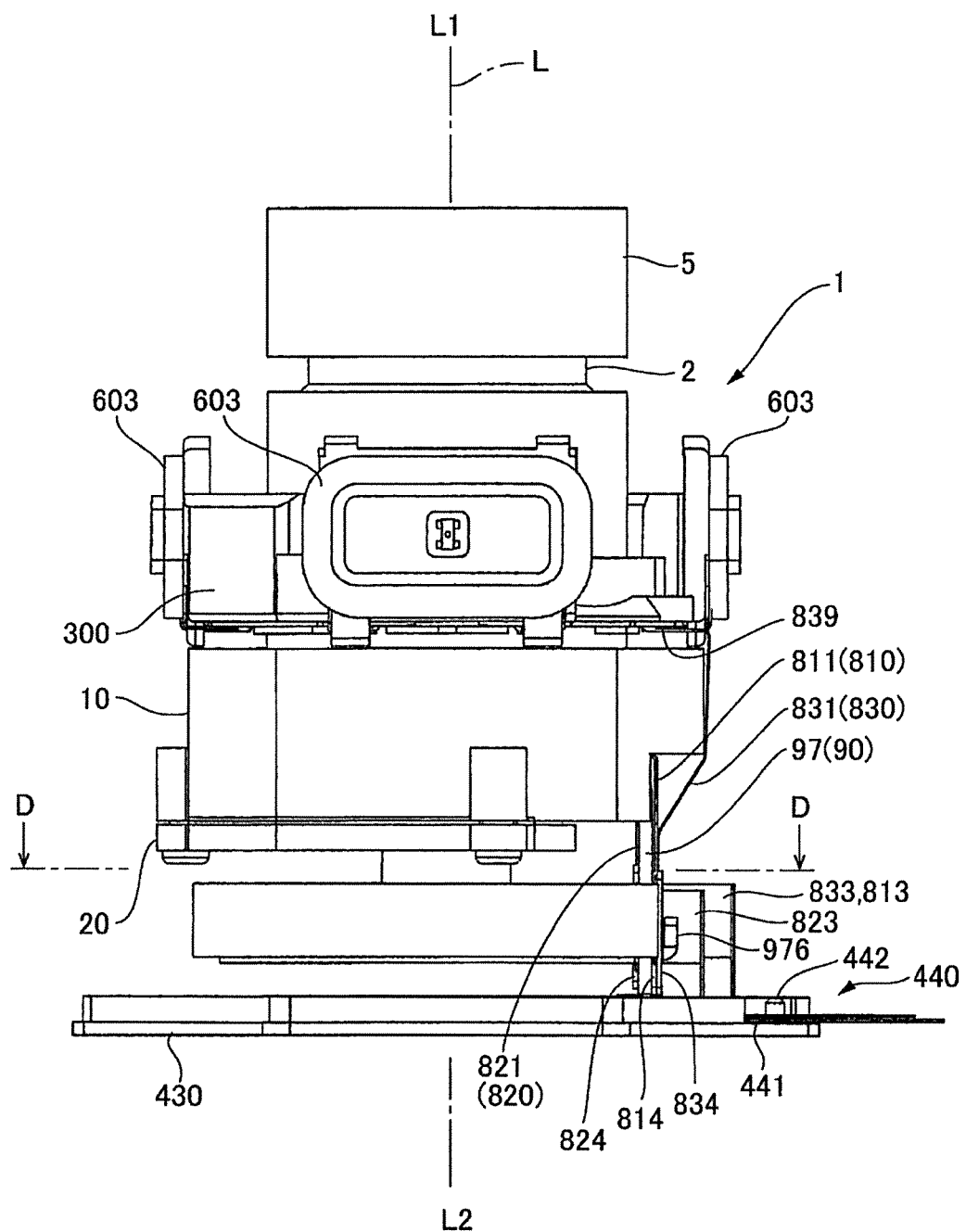
FIG. 13 is a side view of the optical unit with triaxial shake correction function from which a cylindrical casing and an object-side casing are detached.
Figure 14:
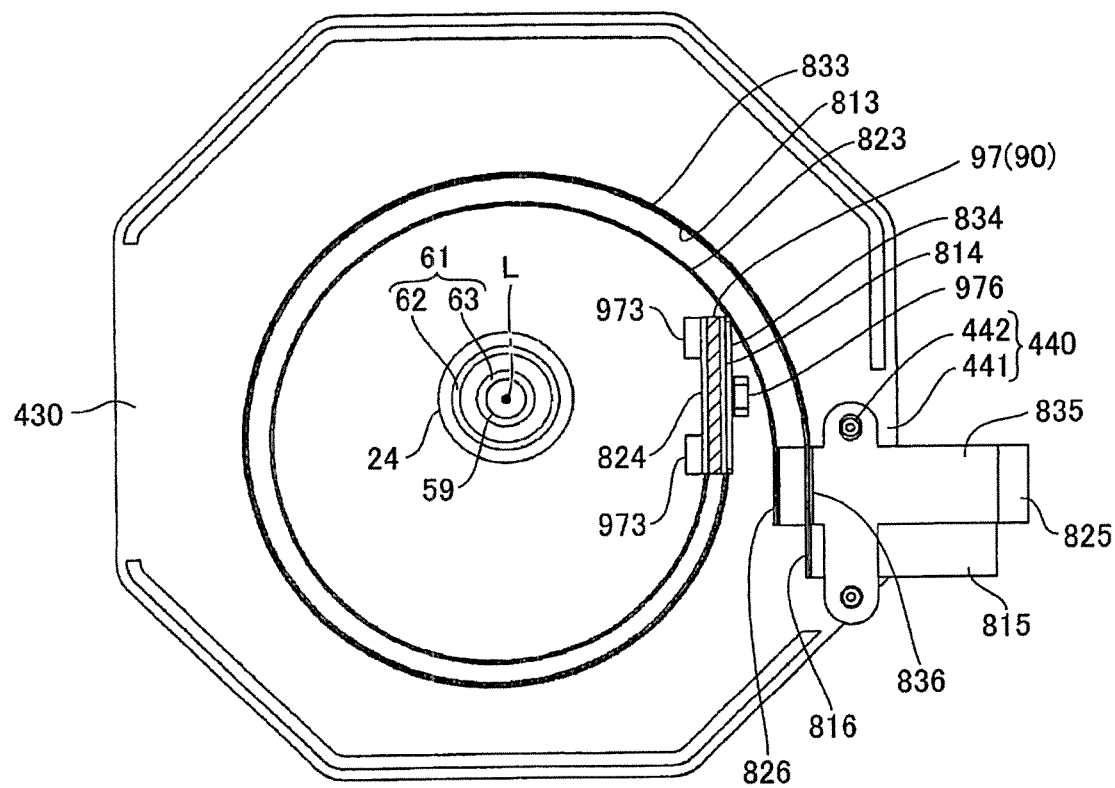
FIG. 14 is a plan view (i.e., a cross-sectional view taken along a line D-D of FIG. 13) of a counter object-side casing and the three flexible printed circuit boards.

FIG. 13 is a side view of the optical unit 100 with triaxial shake correction function from which the cylindrical casing 410 and the object-side casing 420 are detached. FIG. 14 is a plan view of the counter object-side casing 430 and the three flexible printed circuit boards and is a cross-sectional view taken along a line D-D of FIG. 13. The first flexible printed circuit board 810, the second flexible printed circuit board 820, and the third flexible printed circuit board 830 respectively include the connection parts 813, 823, and 833 each including the flexible circuit board 801 extending in the circumferential direction with respect to the optical axis L. Each of the connection parts 813, 823, and 833 is wound with respect to the optical axis L at an outer circumferential side of the rotation supporting mechanism 60. As illustrated in FIGS. 3, 4, and 13, each of the connection parts 813, 823, and 833 has a fixed width in a direction orthogonal to a drawing direction (i.e., a fixed width in the optical axis L direction). Furthermore, each of the connection parts 813, 823, and 833 has one end and the other end in the circumferential direction that are at an identical height in the optical axis L direction.

In other words, in the connection part 813, the portion connected to the first reinforcing part 814 and the portion connected to the rising part 816 are located at the identical height in the optical axis L direction. Furthermore, in the connection part 823, the portion connected to the second reinforcing part 824 and the portion connected to the rising part 826 are located at the identical height in the optical axis L direction. Furthermore, in the connection part 833, the portion connected to the third reinforcing part 834 and the portion connected to the rising part 836 are located at the identical height in the optical axis L direction.

As illustrated in FIG. 14, in the first flexible printed circuit board 810, a part of the first circuit board portion 811 in the circumferential direction and a part of the second circuit board portion 812 in the circumferential direction are provided at an identical angular position. Accordingly, the first flexible printed circuit board 810 is wound by substantially a turn around the optical axis L, and a winding start portion (i.e., the first reinforcing part 814) and a winding end portion (i.e., the rising part 816) are arranged in a range including the identical angular position. Likewise, each of the second flexible printed circuit board 820 and the third flexible printed circuit board 830 is wound by substantially a turn around the optical axis L, and a winding start portion and a winding end portion are arranged in a range including an identical angular position.

As described above, the first reinforcing part 814 of the first flexible printed circuit board 810 extends along the radially outside surface of the protrusion part 97 of the heat dissipating member 90. Furthermore, the second reinforcing part 824 of the second flexible printed circuit board 820 extends along the radially inside surface of the protrusion part 97. Furthermore, the third reinforcing part 834 of the third flexible printed circuit board 830 is arranged radially outside the protrusion part 97 and the first reinforcing part 814 and overlaps with the first reinforcing part 814.

Each of the first reinforcing part 814 and the second reinforcing part 824 is fixed with a double-faced tape to the protrusion part 97 of the heat dissipating member 90. Furthermore, the third reinforcing part 834 is fixed with a double-faced tape to the protrusion part 97 so as to be superimposed on the first reinforcing part 814. In this embodiment, the protrusion part 97 of the heat dissipating member 90 configures a part of the rotation member 1A that rotates on the optical axis L in the optical unit 1 with rolling correction function, and also configures a rotation member-side fixation part that protrudes from the rotation member 1A toward the counter object side L2 and fixes the flexible printed circuit board at the counter object side L2 of the rotation member 1A. The radially outside surface of the protrusion part 97 is an outside fixation surface 971 to which the first reinforcing part 814 and the third reinforcing part 834 superimposed on each other are fixed. The radially inside surface of the protrusion part 97 is an inside fixation surface 972 to which the second reinforcing part 824 is fixed.

As illustrated in FIGS. 6 and 7, the protrusion part 97 of the heat dissipating member 90 is formed with two bent parts 973 that are bent radially inward from a counter object side L2-tip portion of the protrusion part 97. The bent parts 973 are respectively formed on widthwise ends of the protrusion part 97. Furthermore, a cut and raised part 974 that is cut and raised radially outward is formed at a widthwise center of the protrusion part 97. The cut and raised part 974 includes: an abutment part 975 that extends radially outward; and a pressing part 976 that rises from a tip portion of the abutment part 975 toward the object side L1. The pressing part 976 is bent at a substantially right angle and extends from the abutment part 975.

As illustrated in FIGS. 10 and 12, each of the first reinforcing part 814 of the first flexible printed circuit board 810 and the third reinforcing part 834 of the third flexible printed circuit board 830 is formed with a notch 804 at a center of a counter object side L2-end edge. In fixing the first reinforcing part 814 to the protrusion part 97, the first reinforcing part 814 is allowed to slide toward the counter object side L2 along the outside fixation surface 971, the cut and raised part 974 is inserted into the notch 804, and an end edge of the notch 804 is abutted against the abutment part 975 from the object side L1. It is thus possible to determine the position of the first reinforcing part 814 in the optical axis L direction and to fix the first reinforcing part 814. Likewise, in fixing the third reinforcing part 834 to the protrusion part 97, an end edge of the notch 804 in the third reinforcing part 834 is abutted against the abutment part 975 from the object side L1. It is thus possible to determine the position of the third reinforcing part 834 in the optical axis L direction and to fix the third reinforcing part 834. Furthermore, in this state, the first reinforcing part 814 and the third reinforcing part 834 are restricted by the pressing part 976 from being removed radially outward, and the first reinforcing part 814 and the third reinforcing part 834 are held between the outside fixation surface 971 and the pressing part 976 (see FIGS. 4 and 13).

As illustrated in FIG. 11, the second reinforcing part 824 of the second flexible printed circuit board 820 has a counter object side L2-end edge in a linear shape. In fixing the second reinforcing part 824 to the protrusion part 97, the second reinforcing part 824 is allowed to slide toward the counter object side L2 along the inside fixation surface 972, and the end edge of the second reinforcing part 824 is opposed to the two bent parts 973 from the object side L1. It is possible to determine the position of the second reinforcing part 824 in the optical axis L direction and fix the second reinforcing part 824 in such a manner that the second reinforcing part 824 is abutted against the bent parts 973.

(Main Functional Effects of this Embodiment)

In the optical unit 1 with rolling correction function according to this embodiment, the first flexible printed circuit board 810 for the imaging element 40 is drawn with respect to the optical axis L of the optical unit 1 with rolling correction function such that the first flexible printed circuit board 810 is wound by substantially a turn in the circumferential direction. Furthermore, in the portion wound in the circumferential direction (i.e., the connection part 813), one end and the other end in the circumferential direction are at the identical height in the optical axis L direction. The winding amount in the circumferential direction is a turn in this embodiment, but is not limited thereto so long as to be more than a half turn. For example, the winding amount in the circumferential direction may be more than a turn. It is thus possible to make the connection part 813 flexible by winding the flexible circuit board 801 more than a half turn in the circumferential direction at the identical height in the optical axis L direction. It is possible to make the connection part 813 evenly flexible over the overall circumference of the connection part 813 particularly in the case of winding the flexible circuit board 801 a turn as described in this embodiment. Therefore, since the connection part 813 becomes deformed with ease in rotating the rotation member 1A of the optical unit 1 with rolling correction function on the optical axis L, the first flexible printed circuit board 810 is less likely to hinder the operation of the rotation member 1A. It is accordingly possible to perform highly accurate shake correction without enhancing driving force of the rolling magnetic driving mechanism 70.

Also in this embodiment, the second flexible printed circuit board 820 for the rolling magnetic driving mechanism 70 and the third flexible printed circuit board 830 for the swing magnetic driving mechanism 600 are also drawn in the similar manner. Therefore, the second flexible printed circuit board 820 and the third flexible printed circuit board 830 are less likely to hinder the operation of the rotation member 1A. It is accordingly possible to perform highly accurate shake correction without enhancing driving force of the rolling magnetic driving mechanism 70.

In this embodiment, each of the circuit board surface of the first reinforcing part 814 to which the connection part 813 is connected and the circuit board surface of the rising part 816 is perpendicular to the radial direction and is parallel to the optical axis L. Since the connection part 813 is connected to be flush with the first reinforcing part 814 and the rising part 816, the circuit board surface of the connection part 813 is parallel to the optical axis L and is substantially perpendicular to the radial direction. It is possible to make the connection part 813 flexible with respect to each of shake in a direction tilting to the optical axis L and shake in a direction rotating on the optical axis L, by drawing the connection part 813 in the form described above.

In this embodiment, the counter object-side casing 430 of the supporting member 400 is provided with the supporting member-side fixation surface 441 that is perpendicular to the optical axis L, and the second circuit board portion 812 of the first flexible printed circuit board 810 includes the fixation portion 815 that is fixed to the supporting member-side fixation surface 441. As described above, the fixation position where the supporting member 400 is fixed is the surface perpendicular to the optical axis L. It is thus possible to reduce the height of the fixation position in the optical axis L direction. It is accordingly possible to reduce the height, in the optical axis direction, of the space for drawing the first flexible printed circuit board 810. Furthermore, the projection parts 442 on the supporting member-side fixation surface 441 are fixed by fitting to the second circuit board portion 812 of the first flexible printed circuit board 810. It is therefore possible to easily determine the position of the first flexible printed circuit board 810 and fix the first flexible printed circuit board 810.

In this embodiment, the protrusion part 97, which is a part of the heat dissipating member 90, protrudes toward the counter object side L2 and functions as the rotation member-side fixation part. The first flexible printed circuit board 810 is provided with the first reinforcing part 814 that is reinforced by the reinforcing plate 802 and is fixed with the double-faced tape to the protrusion part 97. In the above way, the double-faced tape used for fixing, to the fixation part, the portion where the reinforcing plate is fixed facilitates the handling of the fixed portion. It is accordingly possible to easily and accurately fix the first flexible printed circuit board 810. Furthermore, the protrusion part 97 is provided with the pressing part 976 that presses the first reinforcing part 814 fixed with the double-faced tape, from the outside of the first reinforcing part 814 in the radial direction. It is therefore possible to prevent the first flexible printed circuit board 810 from being removed from the protrusion part 97 since the first flexible printed circuit board 810 expands radially outward so as to become deformed in a direction to resolve the warpage. Furthermore, the protrusion part 97 is provided with the abutment part 975 against which the end edge of the first reinforcing part 814 is abutted. It is therefore possible to define the height of the first reinforcing part 814 in the optical axis L direction. It is thus possible to define the height of the winding start portion of the connection part 813. It is also possible to define the height of the winding end portion of the connection part 813 by fixing the fixation portion 815 of the first flexible printed circuit board 810 to the supporting member-side fixation surface 441. It is accordingly possible to wind the connection part 813 at the identical height in the optical axis L direction.

In this embodiment, the first reinforcing part 814, the second reinforcing part 824, and the third reinforcing part 834 are formed of the reinforcing plates 802 that are equal in circumferential width to one another. The reinforcing plates 802 are larger in width than the flexible circuit boards 801 connected to the first reinforcing part 814, the second reinforcing part 824, and the third reinforcing part 834. As described above, it is possible to ensure an adhesion area of the double-faced tape and to enhance the fixation strength of the double-faced tape by making the widths of the first reinforcing part 814, second reinforcing part 824, and third reinforcing part 834 large.

In this embodiment, the first reinforcing part 814, the second reinforcing part 824, and the third reinforcing part 834 are separately fixed on both the surfaces of the protrusion part 97. As described above, it is possible to fix a plurality of flexible printed circuit boards in accordance with the orientations of the flexible printed circuit boards, by using both the surfaces of the protrusion part 97 as a fixation surface.

In this embodiment, the heat dissipating member 90, to which heat from the imaging element 40 is transmitted, has the end portion that protrudes to serve as the rotation member-side fixation part. It is therefore possible to dissipate heat from the rotation member-side fixation part. It is also possible to simplify the structure since a part of the heat dissipating member is used as the rotation member-side fixation part.

The optical unit 1 with rolling correction function according to this embodiment configures the optical unit 100 with triaxial shake correction function including: the gimbal mechanism 500 that supports the optical unit 1 with rolling correction function such that the optical unit 1 with rolling correction function is able to swing on an axis orthogonal to the optical axis L; and the swing magnetic driving mechanism 600 that corrects shake on the axis orthogonal to the optical axis L of the optical unit 1 with rolling correction function. In this case, each of the first flexible printed circuit board 810, the second flexible printed circuit board 820, and the third flexible printed circuit board 830 is flexible with respect to shake correction on the optical axis L and shake correction on an axis orthogonal to the optical axis L, and is therefore less likely to hinder the shake correction. It is accordingly possible to perform highly accurate shake correction without enhancing driving force of the shake correction mechanism.

Note that in configuring an optical unit with shake correction function that corrects only shake on an axis orthogonal to the optical axis L without performing the rolling correction (i.e., an optical unit with shake correction function that performs only shake correction on an X axis and on a Y axis), a first flexible printed circuit board 810 and a third flexible printed circuit board 830 can be drawn in a manner similar to that described in this embodiment. Also in this case, each of the first flexible printed circuit board 810 and the third flexible printed circuit board 830 is flexible with respect to shake correction on an axis orthogonal to the optical axis L, and is therefore less likely to hinder the shake correction. It is thus possible to perform highly accurate shake correction.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with shake correction function, comprising:
    an optical element;
    a rotation member that includes:
        a circuit board on which an imaging element arranged on a counter object side of the optical element is mounted, and
        a rotational member to which the circuit board is fixed;
    a fixation member that is arranged on the counter object side of the rotational member;
    a rotation supporting mechanism that supports the rotational member such that the rotational member is able to rotate relative to the fixation member;
    a rolling magnetic driving mechanism that causes the rotational member to rotate on an optical axis of the optical element;
    a supporting member that is arranged on the counter object side of the fixation member; and
    a first flexible printed circuit board that is connected to the circuit board,
    wherein the first flexible printed circuit board includes:
        a first circuit board portion that extends from the circuit board toward the counter object side;
        a second circuit board portion that is fixed to the supporting member; and
        a connection part that connects the first circuit board portion to the second circuit board portion, wherein the connection part is wound more than a half turn in a circumferential direction with respect to the optical axis of the optical element, and wherein the connection part has one end and the other end in the circumferential direction that are at an identical position with regard to a height in an optical axis direction.

2. The optical unit with shake correction function according to claim 1, further comprising:
a swing supporting mechanism that supports a movable member including the optical element and the fixation member, such that the movable member is able to swing relative to the supporting member on an axis orthogonal to the optical axis of the optical element; and
a swing magnetic driving mechanism that corrects shake on the axis orthogonal to the optical axis of the movable member.

3. The optical unit with shake correction function according to claim 1, wherein
at least a part of the first circuit board portion and at least a part of the second circuit board portion are provided at an identical angular position.

4. The optical unit with shake correction function according to claim 1, wherein
the connection part has a circuit board surface that is perpendicular to a radial direction with respect to the optical axis.

5. The optical unit with shake correction function according to claim 1, wherein
the supporting member has a supporting member-side fixation surface that is perpendicular to the optical axis,
wherein the second circuit board portion includes:
a fixation portion that is fixed to the supporting member-side fixation surface; and
a rising part that rises from the fixation portion toward an object side, and
wherein the rising part is connected to the connection part.

6. The optical unit with shake correction function according to claim 5, wherein
the supporting member-side fixation surface is formed with a projection part, and
wherein the second circuit board portion is formed with an engagement part to which the projection part is fitted.

7. The optical unit with shake correction function according to claim 1, wherein
the rotation member includes a rotation member-side fixation part that protrudes toward the counter object side,
wherein the first circuit board portion includes a first reinforcing part including a flexible circuit board and a reinforcing plate fixed to the flexible circuit board, and
wherein the first reinforcing part is fixed with a double-faced tape to the rotation member-side fixation part.

8. The optical unit with shake correction function according to claim 7, wherein
the first reinforcing part is larger in a width in a direction orthogonal to a direction from the circuit board to the first reinforcing part, than a portion of the flexible circuit board connecting the circuit board to the first reinforcing part.

9. The optical unit with shake correction function according to claim 7, wherein
the rotation member includes a heat dissipating member to which heat from the circuit board is transmitted, and wherein the rotation member-side fixation part is a part of the heat dissipating member.

10. The optical unit with shake correction function according to claim 9, wherein the rotation supporting mechanism includes:
a rotation shaft that is fixed to the rotational member via the heat dissipating member, and
a bearing part that is disposed on the fixation member, and
wherein the connection part is arranged on an outer circumferential side of the rotation shaft exposed from the bearing part toward the counter object side of the fixation member.

11. The optical unit with shake correction function according to claim 7, wherein the rotation member-side fixation part includes:
an outside fixation surface that is directed radially outward; and
a pressing part that presses the first reinforcing part fixed to the outside fixation surface, from an outside of the first reinforcing part in a radial direction.

12. The optical unit with shake correction function according to claim 11, wherein
the rotation member-side fixation part includes an abutment part against which a counter object-side end edge of the first reinforcing part is abutted, and
wherein the pressing part is bent to extend from the abutment part.

13. The optical unit with shake correction function according to claim 11, wherein
the rotation member-side fixation part includes an inside fixation surface that is directed radially inward, and
wherein a second flexible printed circuit board is fixed to the inside fixation surface.

14. The optical unit with shake correction function according to claim 11, wherein
a third flexible printed circuit board is fixed to the outside fixation surface with the first flexible printed circuit board superimposed thereon.

15. An optical unit with shake correction function, comprising:
a movable member that includes:
an optical element, and
a circuit board on which an imaging element arranged on a counter object side of the optical element is mounted;
a supporting member that is arranged on the counter object side of the movable member;
a swing supporting mechanism that supports the movable member, such that the movable member is able to swing relative to the supporting member on an axis orthogonal to an optical axis of the optical element; and
a swing magnetic driving mechanism that causes the movable member to swing relative to the supporting member on the axis orthogonal to the optical axis; and
a first flexible printed circuit board that is connected to the circuit board,
wherein the first flexible printed circuit board includes:
a first circuit board portion that extends from the circuit board toward the counter object side;
a second circuit board portion that is fixed to the supporting member; and
a connection part that connects the first circuit board portion to the second circuit board portion,
wherein the connection part is wound more than a half turn in a circumferential direction with respect to the optical axis of the optical element, and wherein the connection part has one end and the other end in the circumferential direction that are at an identical position with regard to a height in an optical axis direction.

16. The optical unit with shake correction function according to claim 15, wherein
at least a part of the first circuit board portion and at least a part of the second circuit board portion are provided at an identical angular position.

17. The optical unit with shake correction function according to claim 15, wherein
the connection part has a circuit board surface that is perpendicular to a radial direction with respect to the optical axis.

18. The optical unit with shake correction function according to claim 15, wherein
the supporting member has a supporting member-side fixation surface that is perpendicular to the optical axis,
wherein the second circuit board portion includes:
a fixation portion that is fixed to the supporting member-side fixation surface; and
a rising part that rises from the fixation portion toward an object side, and
wherein the rising part is connected to the connection part.

19. The optical unit with shake correction function according to claim 18, wherein
the supporting member-side fixation surface is formed with a projection part, and
wherein the second circuit board portion is formed with an engagement part to which the projection part is fitted.

* * * * *